United States Patent
Kajita et al.

(10) Patent No.: US 10,170,963 B2
(45) Date of Patent: Jan. 1, 2019

(54) ARMATURE FOR ELECTROMECHANICAL DEVICE WHICH CONVERTS ELECTRICAL ENERGY AND MECHANICAL ENERGY, AND METHOD FOR MANUFACTURING SAME

(71) Applicant: HAYASHI INDUSTRY CO., LTD., Gifu (JP)

(72) Inventors: Ko Kajita, Gifu (JP); Takahiko Hobo, Gifu (JP)

(73) Assignee: HAYASHI INDUSTRY CO., LTD., Gifu (JP)

( * ) Notice: Subject to any disclaimer, the term of this patent is extended or adjusted under 35 U.S.C. 154(b) by 0 days.

(21) Appl. No.: 15/577,604

(22) PCT Filed: Mar. 2, 2016

(86) PCT No.: PCT/JP2016/056359
§ 371 (c)(1),
(2) Date: Nov. 28, 2017

(87) PCT Pub. No.: WO2016/147863
PCT Pub. Date: Sep. 22, 2016

(65) Prior Publication Data
US 2018/0166955 A1    Jun. 14, 2018

(30) Foreign Application Priority Data

Jun. 18, 2015   (WO) .................. PCT/JP2015/067548

(51) Int. Cl.
*H02K 1/00*      (2006.01)
*H02K 15/04*    (2006.01)
(Continued)

(52) U.S. Cl.
CPC ......... *H02K 15/0464* (2013.01); *H01F 41/07* (2016.01); *H01F 41/071* (2016.01);
(Continued)

(58) Field of Classification Search
CPC .. H02K 1/16; H02K 1/26; H02K 3/28; H02K 3/14; H02K 15/0464; H02K 15/065
(Continued)

(56) References Cited

U.S. PATENT DOCUMENTS 4,453,100 A * 6/1984 Nozawa ............. H02K 15/0457
                                                              310/203
5,113,573 A * 5/1992 Taji .................... H02K 15/0485
                                                              29/596
(Continued)

FOREIGN PATENT DOCUMENTS

JP    H08182235    7/1996
JP    H08182238    7/1996
(Continued)

OTHER PUBLICATIONS

International Search Report for PCT/JP2016/056359, dated Jun. 21, 2016, Japan Patent Office, Tokyo, Japan.
(Continued)

*Primary Examiner* — Hanh Nguyen
(74) *Attorney, Agent, or Firm* — Trego, Hines & Ladenheim, PLLC

(57) ABSTRACT

In each coil (10), between a first radial section formed by a winding-start section (10a) and a second radial section formed by a winding-end section (10b) of a winding (10A), the circumferential lengths of the winding lap sections formed by said winding change in a continuous or stepped manner. For a first coil, the sequences within two slots (22) of the winding constituting the first coil are reversed with respect to one another by a twisted section (10d) between a first coil end (12a) and a second coil end (12b) of the first coil. The first coil and next second coil form a lap winding in which the twisted sections of the first and second coils are three-dimensionally entwined. The lap winding of said twisted sections continues for the third and subsequent coils, (Continued)

and the first coil end and the second coil end of each coil are continuous without spaces at the end surfaces of a core (20).

2 Claims, 24 Drawing Sheets

(51) Int. Cl.
| | |
|---|---|
| *H02K 15/06* | (2006.01) |
| *H01F 41/07* | (2016.01) |
| *H01F 41/071* | (2016.01) |
| *H02K 3/14* | (2006.01) |
| *H02K 3/28* | (2006.01) |
| *H02K 3/48* | (2006.01) |
| *H02K 3/12* | (2006.01) |
| *H02K 1/16* | (2006.01) |
| *H02K 1/26* | (2006.01) |

(52) U.S. Cl.
CPC ............... *H02K 3/14* (2013.01); *H02K 3/28* (2013.01); *H02K 3/48* (2013.01); *H02K 15/065* (2013.01); *H02K 15/066* (2013.01); *H02K 1/16* (2013.01); *H02K 1/26* (2013.01); *H02K 3/12* (2013.01)

(58) Field of Classification Search
USPC .......................................... 310/198; 29/596
See application file for complete search history.

(56) References Cited

U.S. PATENT DOCUMENTS

| | | | |
|---|---|---|---|
| 5,926,940 A | 7/1999 | Toh et al. | |
| 7,683,517 B2 * | 3/2010 | Fukasaku | H02K 15/06 242/160.2 |
| 7,923,883 B2 * | 4/2011 | Yamaguchi | H02K 15/067 310/179 |
| 2005/0218746 A1 | 10/2005 | Fukasaku et al. | |
| 2014/0215806 A1 * | 8/2014 | Yamaguchi | H02K 15/068 29/596 |

FOREIGN PATENT DOCUMENTS

| | | |
|---|---|---|
| JP | H09271157 | 10/1997 |
| JP | H1066314 | 3/1998 |
| JP | H10174329 | 6/1998 |
| JP | 2003204659 | 7/2003 |
| JP | 2005295689 | 10/2005 |
| JP | 2008109829 | 5/2008 |
| JP | 2008148375 | 6/2008 |
| JP | 2009195005 | 8/2009 |
| JP | 2010158096 | 7/2010 |
| JP | 2011072052 | 4/2011 |
| JP | 2013233026 | 11/2013 |
| JP | 2014180129 | 9/2014 |

OTHER PUBLICATIONS

International Search Report for PCT/JP2016/057066, dated Jun. 7, 2016, Japan Patent Office, Tokyo, Japan.

* cited by examiner

Fig.1
(a)
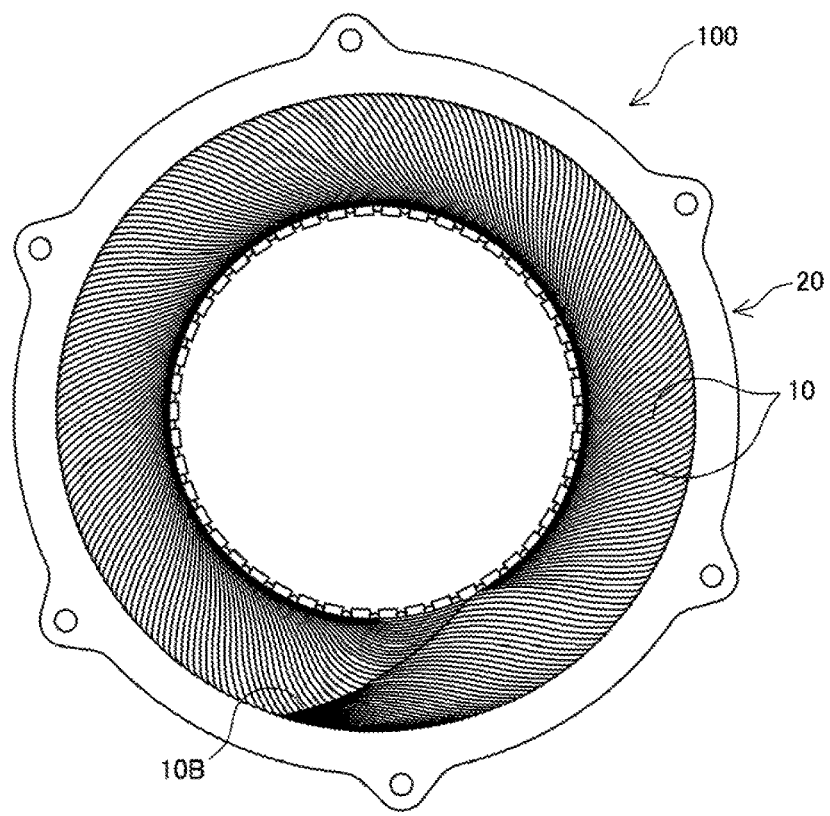
(b)
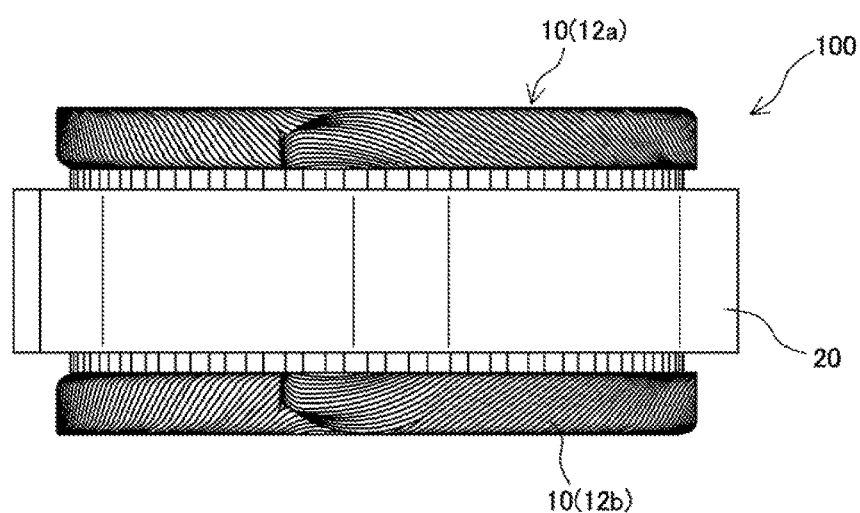

Fig.4
(a)
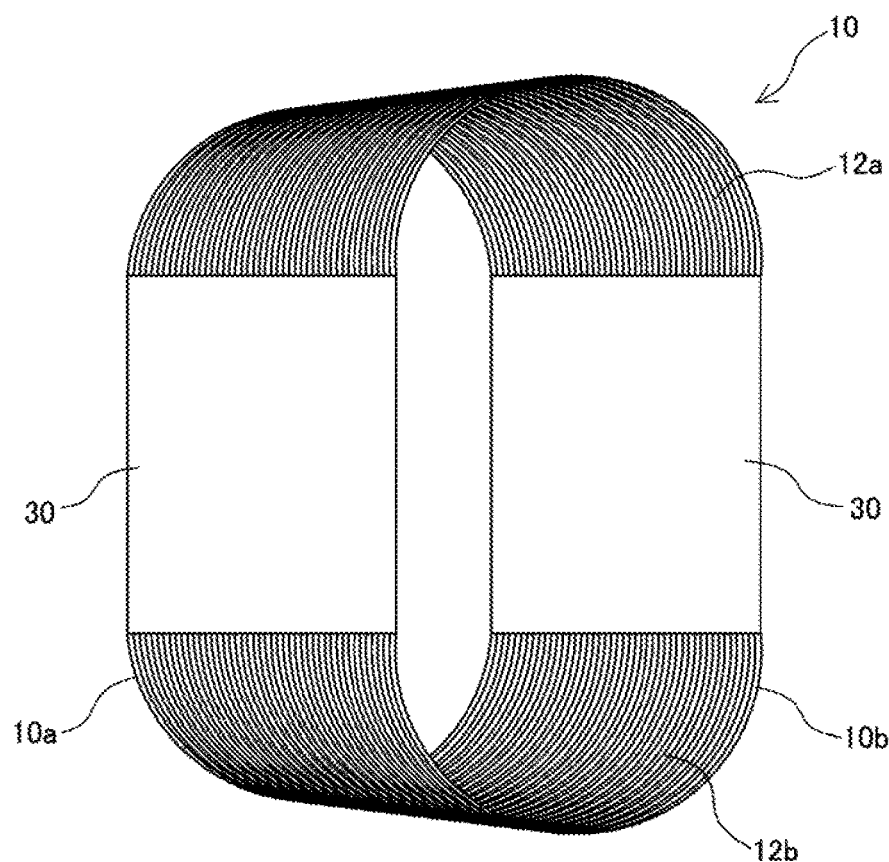
(b)
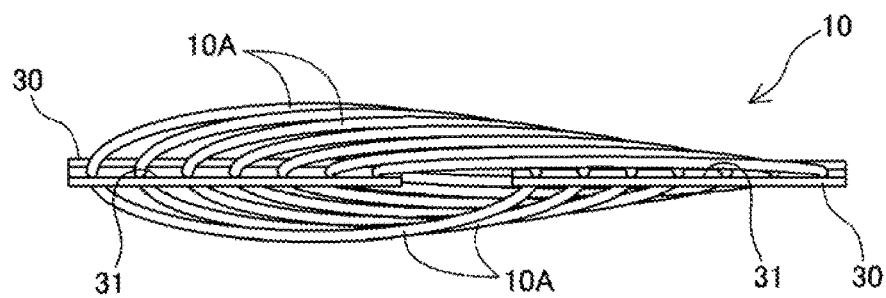

Fig.5
(a)
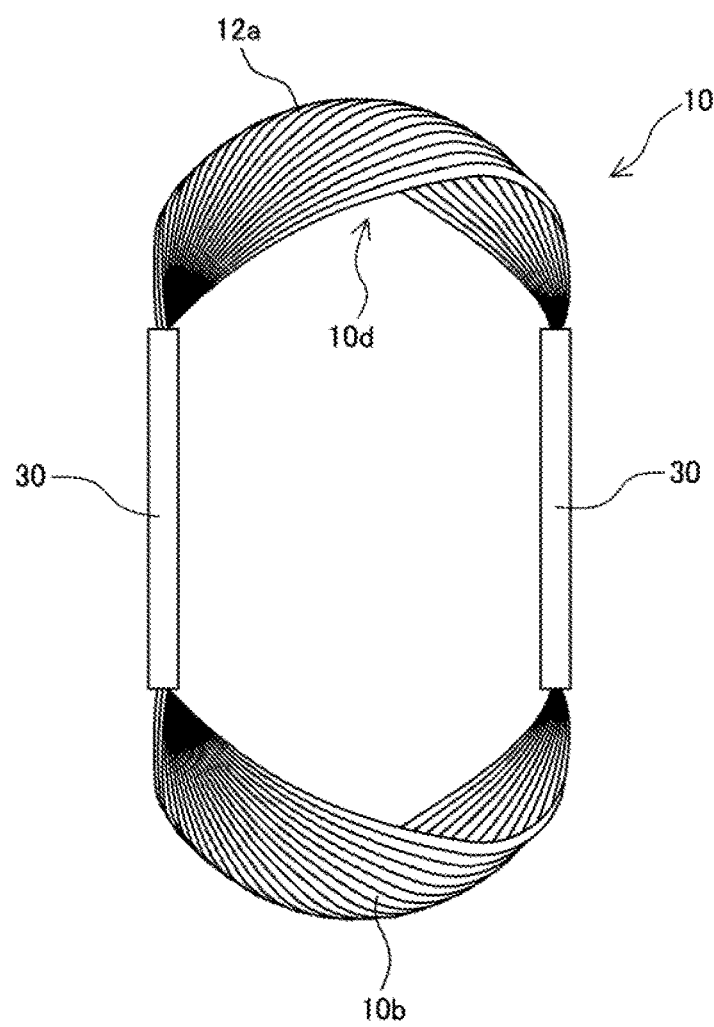
(b)
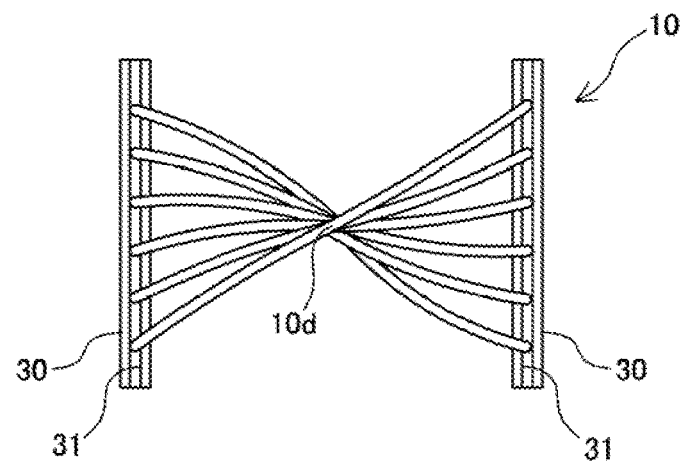

Fig.11
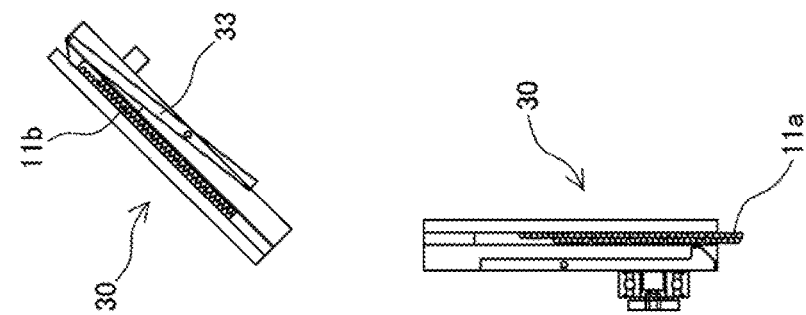
(b)
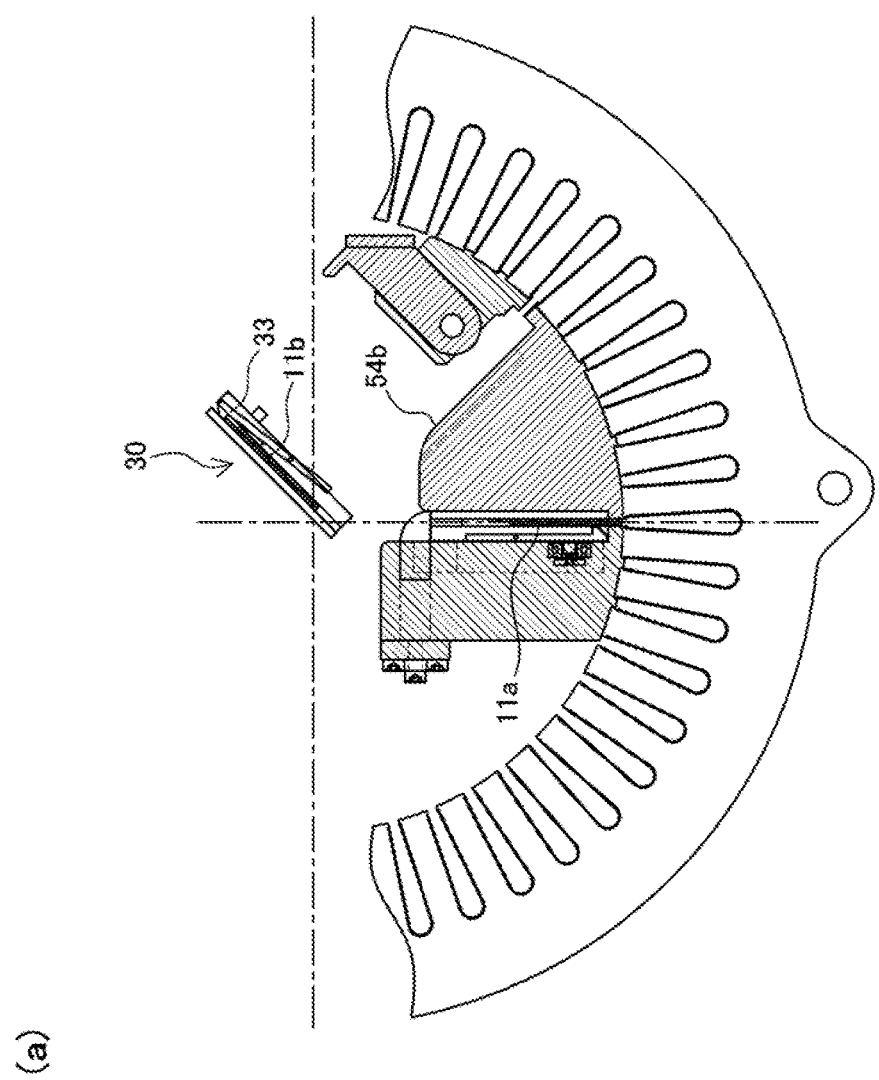
(a)

Fig.16
(a)
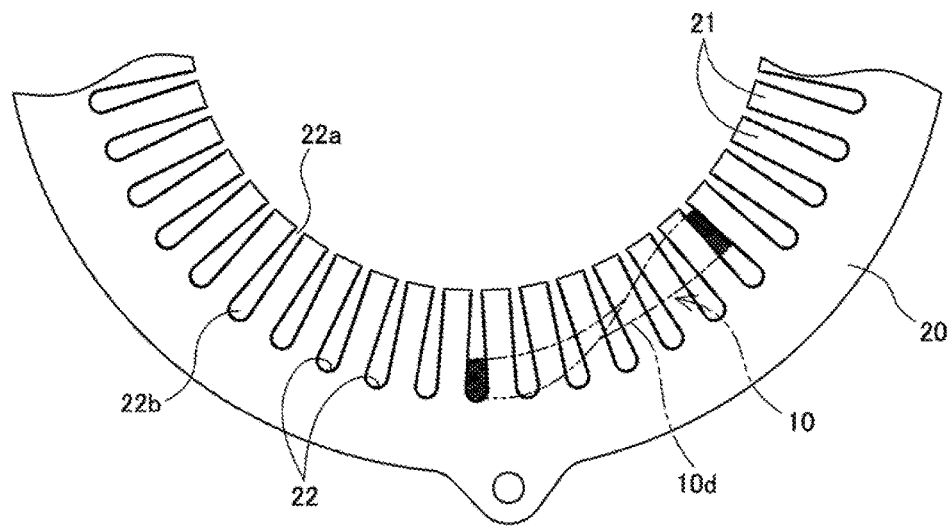
(b)
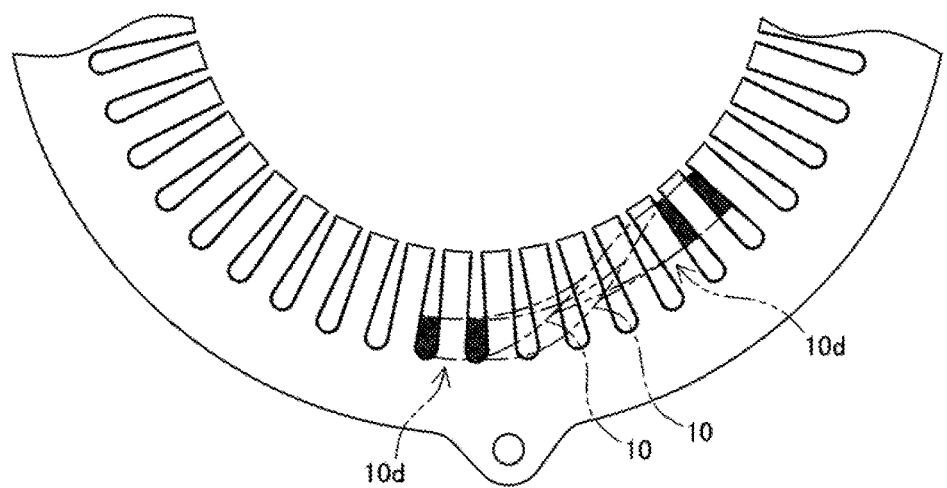

Fig.20
(a)
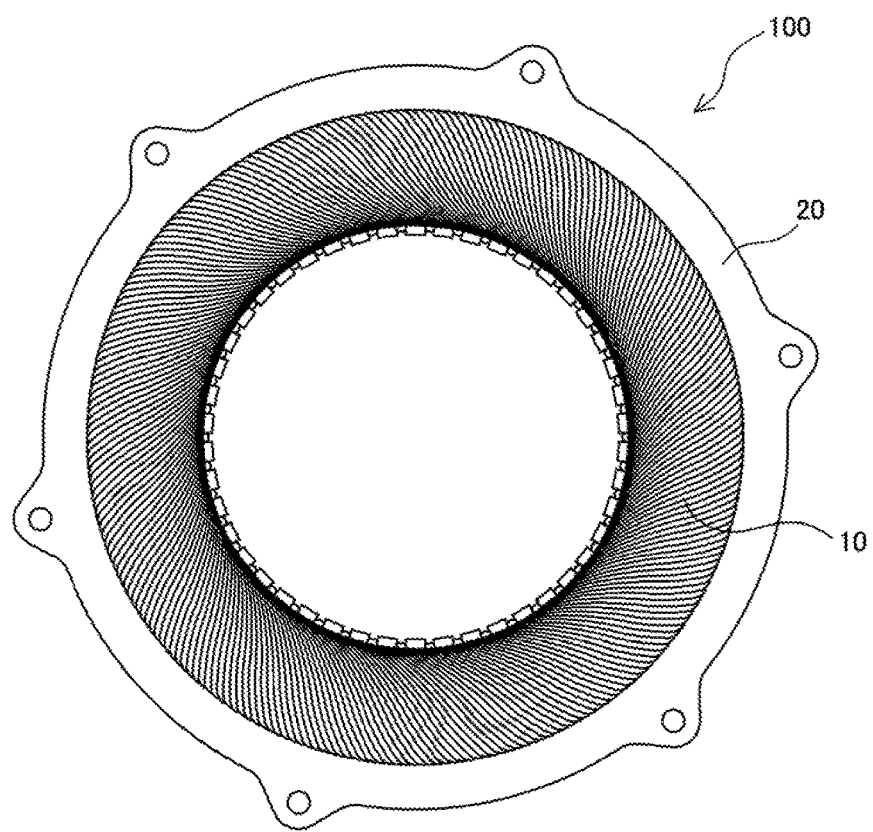
(b)
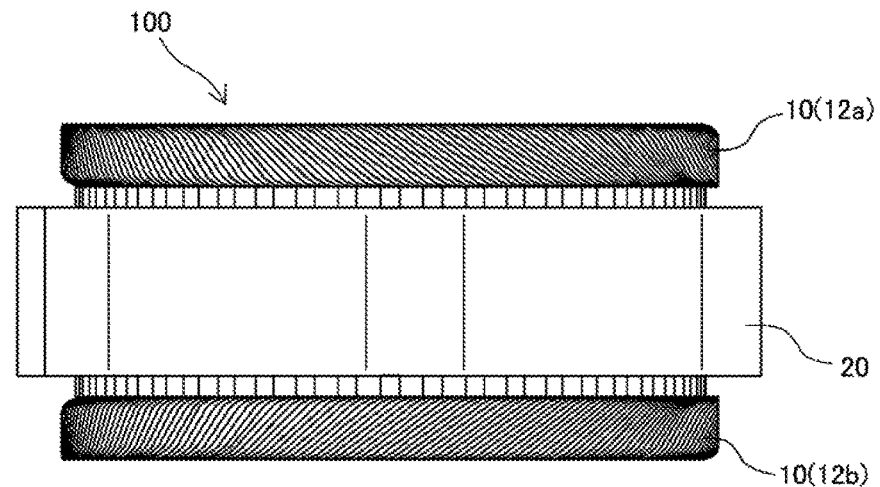

Fig.24
(a)
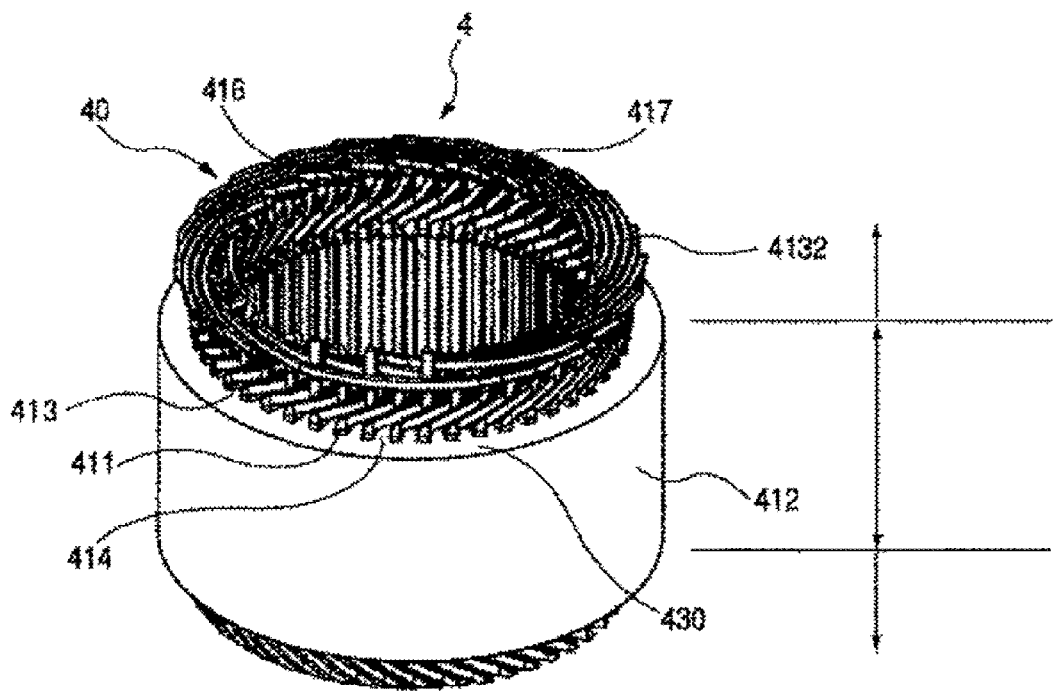
(b)
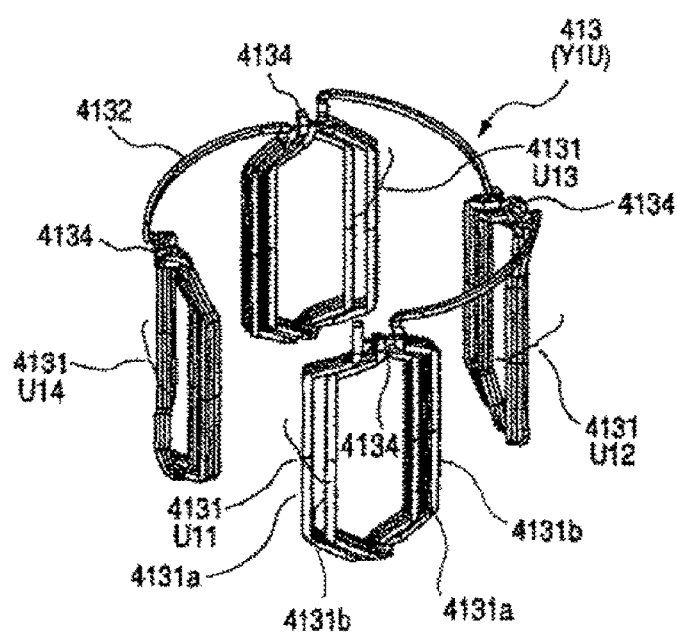

ARMATURE FOR ELECTROMECHANICAL DEVICE WHICH CONVERTS ELECTRICAL ENERGY AND MECHANICAL ENERGY, AND METHOD FOR MANUFACTURING SAME

BACKGROUND OF THE INVENTION

Field of the Invention

The present invention relates to an armature for electromechanical devices such as motors and generators which convert electrical energy and mechanical energy, and a method for manufacturing same.

Description of the Related Art

Armatures for electromechanical devices which convert electrical energy and mechanical energy are made, for example, by winding, a plurality of coils around a number of teeth of a stator core enclosing a central rotor. The winding process is very difficult, because the space (slot) between each of the teeth is very narrow and deep. Great skill is therefore required to wind an amount of coils needed to obtain a sufficient magnetic flux density.

Typical automatable methods that are capable of winding coils at a high density around a stator core, which is a kind of armature in such electromechanical devices, are known. For example, Japanese Unexamined Patent Application Publication No. 1999-312621 proposes a method of "concentrated winding", in which coils are wound concentrated around each tooth, and Japanese Unexamined Patent Application Publication No. 2009-195005 proposes a method of "distributed winding", in which coils are wound across a plurality of slots and coils which are in phase or out of phase with each other are overlapped at the coil ends.

As shown in FIG. 23(a), the coils disclosed in Japanese Unexamined Patent Application Publication No. 1999-312621 are individually wound around each one of a plurality of cores 72 which are separated into multiple sections, such that one coil is wound around one tooth 104 of each core 72. FIG. 23(b) shows one such coil on its own, in which the winding (rectangular wire) is wound in three layers. The cores 72 around which the coils are wound are arranged in a circular shape and integrated to form a stator as shown in FIG. 23(a). In order to wind the rectangular wire windings into the state, shown in FIG. 23(b), the rectangular wire needs to be bent at right angles at the corners of the coil, which causes strain on the bent portions of the rectangular wire.

The coils disclosed in Japanese Unexamined Patent Application Publication No. 2009-195005, which employs distributed winding, are stored in the slots of the core, as shown in FIG. 24(a). This core consists of, for example, 48 slots 411 provided with teeth 414 therebetween, the teeth 414 being integrated with a cylindrical core back 430, in which the coils are stored between the teeth 414 (in the slots), each coil wound around and across a plurality of teeth 414.

One such coil is shown on its own in FIG. 24(b), and consists of a rectangular wire that is wound in a plurality of layers. According to the Abstract of Japanese Unexamined Patent Application Publication No. 2009-195005: "The two coils formed by α-winding a conductor strand whose cross section is rectangular are continuously prepared. The two-continuous lap-wound coil is formed by molding the two-continuous α-wound coil into an oval coin shape, and the coil is formed by being inserted into a slot of the stator. The two-continuous α-wound coil is formed so that the center of a corner wire is pressed against a winding frame, and two rollers are abutted on the corner wire attached to the winding frame so as to be mutually reversely rotated". The coils disclosed in Japanese Unexamined Patent Application Publication No. 2009-195005 are inserted into the slots by an insertion device shown in FIG. 25.

In the coil-equipped core proposed in Japanese Unexamined Patent Application Publication No. 2009-195005, as shown in FIG. 24(a), the "coil end portions" protrude substantially upward and downward from the "slot portion (core portion)". Judging by this appearance, it is likely that significant copper loss will occur at the coil end portions. The substantial protrusion of the coil end portions from the slot (core) portion means not only that copper loss, i.e. loss of energy, is great, but also that a large space is required to store this kind of core.

Incidentally, when it comes to coils for electromechanical devices, the coils themselves, the teeth around which the coils are to be wound, and the slots in which the coils are to be stored must generally be formed uniformly and at equal distances from each other. This is because there is a need to make the rotation of the electrical motor smooth so as to achieve stable functionality, by making each coil generate or cut a constant magnetic flax density per unit time.

While the best way to increase energy density is to fill each slot with as many conducting wires as possible, winding conducting wires (coils) without gaps in the narrow, deep slots is not that simple, as is apparent from FIG. 23(a).

It is a fact regarding coils in general, be it the ones on the side of the rotor, which is an armature, or on the side of the core, that in a case where one conventional coil is stored across two slots, the windings in the same position of the coil will be located in the same position of both slots. Since the slots, both on the rotor side and on the core side, are formed radially relative to the center of the armature, the measurements of their inner sides and the measurements of their outer sides are different. Thus, when an ordinary coil is stored within two slots, the windings will be stored in the same position, which causes inductance non-uniformity in the inner and outer windings (wires) relative to a magnet provided outside the armature, leading to an overall drop in efficiency of the coil. The reason for this is that when an identical voltage is applied to the wires simultaneously, a greater current will flow in the wires with lower inductance, and this inductance non-uniformity will work toward reducing overall efficiency of the coil. There is thus a demand for a coil configured to enable equalization of the inductance non-uniformity in the windings to allow for improvement of the efficiency of the armature, resulting in improved efficiency of the electromechanical device which is a motor or a generator.

To that end, an armature proposed in Japanese Patent No. 5394058 has the following configuration, as described in claim 1 thereof:

"An armature of an electric motor comprising: a core including a plurality of slots and a plurality of teeth formed between the slots; and a winding made of a bundled plurality of wires, the winding including, a plurality of coil parts and a plurality of connecting portions, the coil parts inserted into the slots and wound around and across the plurality of teeth by distributed winding, the connecting portions connecting the coil parts together, the winding having a twisted shape in the connecting portions".

This configuration was made in view of the problem of conventional armatures that inductance non-uniformity in each wire is the cause of lower coil efficiency and reduced motor efficiency, and made improvements for the purpose of providing an armature and electric motor that can improve motor efficiency.

Meanwhile, paragraph [0013] of Japanese Patent No. 5394058 discloses the following: "The winding includes coil parts and connecting portions. The coil parts are inserted into the slots and wound around and across the plurality of teeth by distributed winding. The connecting portions connect the coil parts together. The winding has a twisted shape in the connecting portion".

Thus, it is found based on claim 1 of Japanese Patent No. 5394058 that the armature proposed therein is characterized in that:

the coils are wound around and across the plurality of teeth several times by distributed winding
the coils are connected together by the connecting portions
the windings have a twisted shape in the connecting portions.

As mentioned above, these "connecting portions" disclosed in Japanese Patent No. 5394058 serve to "connect the coil parts together", and thus correspond to the "connecting lines electrically connecting the coils to each other" of the invention described below, and not the "coil ends" (the sections that electrically connect the sections of the distributedly wound windings inserted into the slots on both sides of the core) that constitute the coils themselves. In other words, merely twisting these "connecting portions" disclosed in Japanese Patent No. 5394058 does not make it possible to increase the density of windings at the coil ends to suppress the occurrence of copper loss, and thus cannot improve efficiency of the electromechanical device at the coil ends.

Thus, in this kind of armature and the coils that constitute such an armature, typical problems that must be solved in a comprehensive and simultaneous manner are as follows:

(A) Manufacturing and handling of the coils themselves should be easy.
(B) Insertion of coils into the slots should be made easier.
(C) Space factor of coils in the slots should be increased.
(D) The coil ends should be made smaller when used as part of an armature.
(E) It should be possible to equalize the inductance non-uniformity in each winding to increase efficiency when used as part of an armature.
(F) When used as part of an armature, the entire coils including the coil ends should be made in a dense configuration with high thermal conductivity, making for an armature with high heat dissipation.
(G) As a result, it should be possible to make the electromechanical device compact and efficient, and also to facilitate manufacturing of the electromechanical device itself. As proposed in the patent literature cited above, these problems are gradually being addressed.

However, considering for example motors being installed in automobiles in recent years, there are many pressing demands, such as how to compactly install the motor in a limited space, how to improve performance while making the motor compact, how to stabilize inductance to enable stable driving at both low and high speeds, and how to facilitate mass production in a short time.

The contents of Japanese Unexamined Patent Application Publication No. 1999-312621, Japanese Unexamined Patent Application Publication No. 2009-195005, and Japanese Patent No. 5394058 are incorporated herein by reference in their entirety.

SUMMARY OF THE INVENTION

Problems to be Solved by the Invention

In view of the above, the inventors have considered how to obtain an armature that achieves the aforementioned objects (A) to (G) in a comprehensive and simultaneous manner, and also enables a more compact configuration, increased power and more stable inductance when used in an electromechanical device, and expanded possibilities for automated mass production. As a result, the inventors discovered that when inserting a plurality of coils wound by distributed winding into each slot of a core, the coil end portions must naturally be adequately managed. In other words, the way of performing lap winding of a plurality of coil ends must be improved. The present invention was made based on this discovery.

A first objective of the present invention is to provide an armature in which the coils can easily be inserted into the slots and have a high space factor, the coil ends of each coil can be made small, and the armature can allow for construction of a highly efficient electromechanical device.

Further, a second objective of the present invention is to provide a method of manufacturing an armature that allows an electromechanical device to be made compact, facilitating production of the electromechanical device itself.

Means of Solving the Problems

In order to solve the aforementioned problems, the invention according to claim 1 employs the following means, described here using reference numerals that are used in the below description of an embodiment of the present invention:

"An armature 100 that constitutes an electromechanical device that converts electrical and mechanical energy, the armature comprising:

a plurality of distributedly wound coils 10, each coil 10 having a first storage section 11a, a second storage section 11b, and a first coil end 12a and a second coil end 12b that electrically connect the first storage section 11a and the second storage section 11b; and a stator core or rotor 20 having a plurality of slots 22 in which the coils 10 are stored, wherein in each coil 10, between a first radial section formed by a winding-start section 10a and a second radial section formed by a winding-end section 10b of windings 10A constituting, the coil 10, circumferential lengths of winding lap sections formed by the windings 10A change in a continuous or stepped manner, a first coil 10, the first storage section 11a and second storage section 11b of which are stored in two slots 22, has a twisted section 10d formed in each of its first coil end 12a and second coil end 12b, whereby sequences within the two slots 22 of the windings 10A constituting the first coil 10 are reversed with respect to each other, a second coil 10, stored in next two slots 22 after the slots 22 in which the first coil 10 is stored, has twisted sections 10d that are shifted relative to the twisted sections 10d the first coil 10 by an amount of pitch between the respective slots 22, whereby the twisted sections 10d of the first coil 10 and the second coil 10 become three-dimensionally entwined in a lap winding, and the lap winding of the twisted sections 10d continue for a third coil 10 and subsequent coils 10, such that the first coil ends 12a and the second coil ends 12b of the coils 10 are continuous without spaces at an end face of the stator core or rotor 20."

First, as shown in, FIGS. 2 to 7 or FIG. 21, the coil 10 used in the armature 100 according to claim 1 consists of a plurality of windings 10A that are wound by distributed winding. In other words, as shown, in FIG. 6, connecting wires 10C are provided projecting at one end surface side (a determined side) of the stator core or the rotor 20 thereinafter sometimes referred to simply as "core 20") of the armature 100. These connecting, wires 10C make the coils 10 electrically continuous with each other. Further, in the coils 10 electrically connected by the connecting wires 10C, the connecting lines 10C of the coils 10 at either end are used respectively as a power line and a ground wire. Of course, the windings 10A, which constitute the coils 10 apart from the connecting wires 10C, are used as a first storage section 11a and a second storage section 11b, and a first coil end 12a and a second coil end 12b, described below, and the windings 10A constituting each of these parts are electrically continuous.

In other words, these coils 10 are wound by distributed winding, in which the coils are wound across a plurality of slots and coils which are in phase or out of phase with each other are overlapped at the coil ends, like the ones proposed in Japanese Unexamined Patent Application Publication No. 2009-195005, and have first and second storage sections 11a and 11b which will each be stored in one of two slots 22. Between these first and second storage sections 11a and 11b, as shown in FIG. 4(a), the first coil end 12a is exposed at the upper side of the drawing and the second coil end 12b is exposed at the lower side of the drawing. Further, as shown in FIG. 2(a) and FIG. 6, in this coil 10 both ends of the windings 10A are left in a state of projecting from the coil 10 as connecting wires 10C for electrically connecting the coil 10 to another coil 10 or to a power supply.

Each coil 10 constituting the armature 100 according to claim 1 is manufactured according to the method described later, and have a basic configuration in which a plurality of windings 10A are wound around a bobbin 40 as shown in for example FIG. 2 or FIG. 3 to form the first and second storage sections 11a and 11b that are to be stored in the slots 22 defined by the teeth 21 as described above, and the first and second coil ends 12a and 12b that are continuous between the first and second storage sections 11a and 11b and are arranged on the outside of the core 20, wherein the first storage section 11a and the second storage section 11b of the coil 10 are held by two robotic hands or holding tools 30 described later, in a state maintaining the alignment of the windings 10A. Accordingly, the coils 10 used in the armature according to claim 1 enable the following:

(A) Both round wires and rectangular wires may be used as the conducting wires that constitute the coils, with no limitations on the shape of the cross-section of the wires.

In particular, in each coil 10 mentioned above, as shown in FIG. 4(a), between a first radial section formed by a winding-start section 10a and a second radial section formed by a winding-end section 10b of the windings 10A constituting the coil, the circumferential lengths of the winding lap sections formed by the windings 10A change in a continuous or stepped manner.

In this example of one coil shown in FIG. 4(a), two holding tools 30 described later grab the first storage section 11a and the second storage section 11b while maintaining the alignment of the windings 10A, and when the holding tools 30 are rotated relative to each other to a substantially parallel state as shown in FIG. 5(a), the first and second coil ends 12a and 12b will project vertically from the coil 10 in FIG. 5(a). In the first and second coil ends 12a and 12b, since the circumferential lengths of the winding lap sections formed by the windings 10A change in a continuous or stepped manner between a first radial section formed by a winding-start section 10a and a second radial section formed by a winding-end section 10b of the windings 10A, and since the alignment of the root portions of the coil ends is maintained by the holding tools 30, twisting of the first and second coil ends 12a and 12b causes the windings 10A with shorter circumferential lengths to be located inwardly (nearer the end surface of each holding tool 30) of the windings 10A with longer circumferential lengths.

Looking at the coil 10 shown in FIG. 5(a) from above, the windings 10A are located inwardly in order of shortness of circumferential length, and the windings 10A intersect in the center between the holding tools 30, as shown in FIG. 5(b). This intersection of the windings 10A is the twisted section 10d which will be described later. As shown in FIGS. 6 and 7, in this twisted section 10d, the windings 10A are entwined with each other without becoming stacked in the holding direction of the holding tools 30, and expand toward the portion of the windings 10A held by the holding tools 30, thus forming a next coil receiver 10e for receiving the twisted section 10d of the next coil 10 to be placed, as shown in FIG. 7.

The circumferential lengths of the winding lap sections formed by the windings 10A must be made to change in a continuous or a stepped manner, which is achieved by employing the following method, using a bobbin 40 as shown in FIG. 2(b) for a continuous change, and a bobbin 40 as shown in FIG. 3 for a stepped change:

"A method for manufacturing a coil 10 to be installed in a slot 22 between teeth 21 of a stator core or rotor 20 for an electromechanical device that converts electrical energy and mechanical energy, the method including the following steps:

(α) winding a plurality of windings 10A around the periphery of a cylindrical or frame-shaped bobbin 40 having two insertion grooves 41 to form a first storage section 11a and a second storage section 11b that are to be stored in the slots 22, and a first coil end 12a and a second coil end 12b that are continuous between the first and second storage sections 11a and 11b;

(β) inserting a robotic hand or holding tool 30 into each insertion groove 41 to hold the windings 10A constituting the first storage section 11a and the second storage section 11b while maintaining the alignment of the windings 10A with each other; and (γ) removing the coil 10 from the bobbin 40 while holding the first storage section 11a and the second storage section 11b with the robotic hands or holding tools 30."

In an embodiment where the circumferential lengths of the windings 10A between the winding-start sections 10a and the winding-end sections 10b in step (α) of this method are made to change in a continuous manner, a bobbin 40 as shown in FIG. 2(b) is employed. This bobbin 40 may be, for example, a tapered cylinder with its diameter at the left end as shown being the smallest, and its diameter at the right end as shown being the largest. Of course, this bobbin 40 may also be a simple cylinder with the same diameter along its entire length, or a frame. When the bobbin 40 is a frame, it may be tapered such that the size of one end is the largest and the size of the other end is the smallest.

In addition, as shown in FIG. 2(b), two insertion grooves 41, into which one of two plates that constitute a holding tool 30 is to be inserted, are formed in the bobbin 40. Several such bobbins 40 are used when manufacturing the coils 10, at which time, in case a change in a stepped manner is to be achieved as shown in FIG. 3, for example, the bobbins may be integrated in the axial direction, having the large diameter ends paired together and the small diameter ends paired together.

In the aforementioned step (α), the windings 10A that are the material of the coil 10 are wound around the periphery of the cylindrical or frame-shaped bobbin 40. Winding of the windings 10A in practice is carried out by feeding the windings 10A which are subjected to a predetermined tensile load onto the aforementioned bobbin 40 while rotating the bobbin 40. About 4 windings 10A are fed onto the bobbin 40 at a time.

Further, in a case where several bobbins 40 are integrated in the axial direction, having the large diameter ends paired together and the small diameter ends paired together, a plurality of coils 10 may be formed simultaneously. In such a case, since the windings 10A are fed continuously, connections of the windings 10A at the winding-start sections 10a and winding-end sections 10b, in other words connecting wires 10C as shown in FIG. 6, can be formed between adjacent coils 10.

In this manner, a coil 10 having a first storage section 11a and a second storage section 11b, and a first coil end 12a and a second coil end 12b that are continuous between the first and second storage sections 11a and 11b, is formed on the bobbin 40.

Next, in step (β), after inserting part of the robotic, hands or holding tools 30 into the insertion grooves 41 as shown in phantom in FIG. 2(b), the windings 10A constituting the first storage section 11a and the second storage section 11b are clamped by the holding tools 30. The windings 10A constituting the first storage section 11a and the second storage section 11b are thus held in parallel to each other by the holding tools 30.

Then, in step (γ) the holding tools 30 hold the first storage section 11a and the second storage section 11b of the windings 10A while the holding tools 30 and the bobbin 40 are moved relative to each other, so that the coil 10 with the windings 10A constituting the first storage section 11a and the second storage section 11b held in parallel to each other by the holding tools 30 is removed and separated from the bobbin 40.

Further, in this step (γ), in a case where several bobbins 40 are integrated in the axial direction, having the large diameter ends paired together and the small diameter ends paired together, a required number of coils 10 in which the winding-start sections 10a and winding-end sections 10b are connected can be formed by letting the winding-start sections 10a and winding-end sections 10b remain connected. In such a case, the connecting portion of the winding-start sections 10a and the winding-end sections 10b will be the connecting wire 10C shown in FIG. 6.

Meanwhile, in an example in which the windings 10A between winding-start sections 10a and the winding-end sections 10b in step (α) of this method are made to change in a stepped manner, a bobbin 40 as shown in FIG. 3 is employed. FIG. 3 shows two bobbins 40 integrated in the axial direction having the large diameter ends paired together, each bobbin 40 formed in a continuous manner of a cylinder having an outer diameter that changes in three steps. Of course, the surface of the cylinder forming each step is parallel to the axis of the bobbin 40, such that windings 10A wound around these cylinder surfaces cannot be displaced. The configuration of any other parts of this bobbin 40 that changes in a stepped manner are similar to those of the bobbin shown in FIG. 2(b).

The bobbin 40 as shown in FIG. 3 may be a simple cylinder with the same diameter in each step, or it may be a frame, in which case its size may change in a stepped manner in which the size of one end is the smallest and the size of the other end is the largest, similarly to the bobbin 40 shown in FIG. 2(b).

A twisted section 10d as shown in FIGS. 5, 6, and 7 is formed in the first coil end 12a and the second coil end 12b by twisting the holding tool 30 holding the second storage section 11b of the coil 10 relative to the holding tool 30 holding the first storage section 11a. This twisted section 10d is formed by relative rotation of the holding tools 30 in the state shown in FIG. 2(a) by 180 degrees (to the state shown in FIG. 5).

When this twisted section 10d is formed, between a first radial section formed by a winding-start section 10a and a second radial section formed by a winding end section 10b of the windings 10A, the radii of the winding lap sections formed by the windings 10A change in a stepped manner. Therefore, in the twisted section 10d, the winding sections will be twisted, in upward order, from the winding section with the smallest radius to the winding section with the largest radius as shown in FIGS. 6 and 7, and around the first coil end 12a and second coil end 12b of the first coil 10 will be formed a space, in other words a next coil receiver 10e, in which a twisted section 10d of a second coil 10 can be arranged in a closely adhered state, as shown in FIGS. 5, 16(b), and 17.

It is important that a twisted section 10d is formed in the first coil end 12a and the second coil end 12b in each of the aforementioned coils 10. The reason for this is that when the first storage section 11a and the second storage section 11b of the coil 10 are inserted into two respective slots 22, the formation of this twisted section 10d in the first and second coil ends 12a and 12b of the coil 10 will cause the sequences within the two slots 22 of the windings 10A constituting the coil 10 to be reversed with respect to each other, as shown for example in FIG. 17.

The example shown in FIG. 17 illustrates a case where two coils 10 are inserted into one slot 22. In this example, the first storage section 11a and the second storage section 11b of the first coil 10 are respectively inserted into the outer side and inner side of two slots 22 separated by a predetermined pitch (for example, in a core 20 that has 48 slots 22, they are inserted into the first and seventh slots 22). In FIG. 17, the plurality of windings 10A constituting the first and second storage sections 11a and 11b of the coil 10 are shown separated into three parts, and it can be seen that between the first slot 22 and the seventh slot 22, the twisted section 10d causes the position of these parts within the slots 22 to be completely reversed.

When the first and second storage sections 11a and 11b of the first coil 10 are inserted into two slots 22, if the plurality of windings 10A constituting the coil 10 are completely reversed with respect to the slots 22. the windings 10A of the coil 10 in the two slots 22 will, be positioned reversed to each other. In this case, the inductances occurring in the windings 10A in the inner and outer sides of the slots 22 will be equalized with respect to a magnet provided apart from the armature 100, eliminating an overall reduction in coil efficiency. This is because when an identical voltage is applied to all of the windings WA, an almost identical current will flow through the coil, whereby there will be no inductance non-uniformity, and the overall efficiency of the coil will be increased. Accordingly, providing; the twisted section 10*d* to the coil 10 enables equalization of the inductance non-uniformity in the windings 10A and thus an improvement of efficiency of the armature 100, resulting in improved efficiency of the electromechanical device that is a motor or generator.

Further, it is important that a twisted section 10*d* is formed in the first coil end 12*a* and in the second coil end 12*h* in each coil 10, because as described later regarding method of mounting the coil 10 onto teeth 21, and as shown in FIG. 17, when mounting a plurality of coils 10 onto a plurality of teeth 21, by having the twisted sections 10*d* formed in the first and second coil ends 12*a* and 12*b* overlap each other, the twisted sections 10*d* will be positioned such that they are collected between the first and seventh slots 22, whereby a next coil receiver 10*e* as shown in FIGS. 6 and 7 will be formed around the collected twisted sections 10*d*.

In this next coil receiver 10*e*, the circumferential lengths of the winding sections between the first radial section formed by the winding-start section 10*a* and the second radial section formed by the winding-end section 10*b* change in a continuous or stepped manner. Therefore, as shown in FIGS. 5 and 7, the plurality of windings 10A will enter in order from the winding-start section 10*a*, which has the smallest radius, to the winding-end section 10*b*, which has the largest radius. In other words, the first and second coil ends 12*a* and 12*b* of the first coil 10 will, as shown in FIG. 7, become naturally and three-dimensionally entwined with the first and second coil ends 12*a* and 12*b* of the next coil 10, centered around the twisted sections 10*d*, and will overlap each other in a continuous manner without spaces around the twisted sections 10*d* and next coil receivers 10*e*.

The armature according to claim 1 configured as described above will now be described in an example in which two coils are stored in one slot. In this case, as shown in FIGS. 16(*a*) and 17, the first storage section 11*a* and the second storage section 11*b* of the first coil 10 are respectively stored in a first slot 22 and a second slot 22 separate from the first slot 22 by a certain distance. At this time, the windings 10A constituting the first and second storage sections 11*a* and 11*b* are in an unraveled state within the slots 22, leaving space for insertion of the first and second storage sections 11*a* and 11*b* of subsequent coils 10 to be stored.

Specifically, insertion of coils 10 into the stator core 20 is carried out by applying a pressing force to the windings 10A constituting the first and second storage sections 11*a* and 11*b* of the coil 10 in a direction that is orthogonal to the wire direction of the windings 10A. Meanwhile, at the entrance of each axial opening 23 of the stator core 20 there are formed projections for preventing inserted windings 10A from popping back out. In other words, when viewing the stator core 20 from above, as shown for example in FIG. 12(*a*), the outer sides of the slots are wider than the entrances.

When the first and second storage sections 11*a* and 11*b* of the coil 10 held in the holding tools 30 are inserted into the narrow entrances (axial of 23) of the stator core 20, they must be inserted a little at a time, in a direction that is orthogonal to the wire direction of the windings 10A. When round wires are used as the windings 10A, they can be stored smoothly without any resistance. In addition, since the coils 10 are wound by distributed winding, the windings 10A that have been inserted toward the outer side, which is wider than the entrance of the stator core 20, will naturally unravel in a direction that is orthogonal to the wire direction. As a result, the windings 10A in the stator core 20 will be inserted at a high density even in the wider outer side, providing a greater advantage to the use of round wires.

In the state of the coil 10 shown in FIG. 16(*a*), a twisted section 10*d* as shown in FIGS. 5(*a*) and (*b*) is formed in the first coil end 12*a* and in the second coil end 12*b*. This twisted section 10*d* is formed by relative rotation of the holding tools 30 in the state shown in FIG. 2(*a*) by about 180 degrees (to the state shown in FIG. 5(*b*)). At this time, the winding sections are twisted upwardly such that, as shown in FIGS. 5, 6, and 16(*b*), around the first and second coil ends 12*a* and 12*b* of the first coil 10 there is formed a space in which the twisted section 10*d* of a second coil 10 can be arranged in a closely adhered state. In other words, a next coil receiver 10*e* is formed.

By subsequently mounting coils 10 in the same manner, the windings 10A, of the coils will be mounted on the stator core 20 without spaces, resulting in the completion of a stator as shown in FIGS. 1(*a*) and (*b*), which achieves the following:

(D) The space factor of the coils in the slots can be made high.

(E) The coil ends can be made small for use in an electromechanical device,

Both in the case where one coil is stored in one slot, and in the case where two coils are stored in one slot, the distributedly wound coils 10 are stored after being put in the state shown in FIG. 5(*b*). In other words, looking at one coil 10, the position of the first storage section 11*a* stored in the first slot 22 is on the opposite side relative to the second storage section 11*b* stored in the second slot 22 separate from the first slot by a certain distance, due to the twisted section 10*d* of the coil 10.

In this state, that is when the first storage section 11*a* and the second storage section 11*b* are on opposite sides due to the twisted section 10*d* of the coil 10, when the first section of the windings 10A of the first storage section 11*a* stored in the first slot 22 is on the inner side, as shown in FIGS. 16(*a*) and 17, the last section of the windings 10A of the second storage section 11*b* stored in the second slot 22 separate from the first slot by a certain distance will be located on the outer side of the second slot 22.

In general, when a distributedly wound coil without a twisted section is stored in two slots, the first section of the windings of the first storage section stored in a first slot, and the first section of the windings of the second storage section stored in a second slot separate from the first slot by a certain distance, will be located in the same position of each slot. Since the slots, both on the rotor side and on the core side, are formed radially relative to the center of the armature, the measurements of their inner and outer sides are different. Thus, when a distributedly wound coil without a twisted section is stored in two slots, the windings will be stored in the same position, which causes inductance non-uniformity in the inner and outer windings (wires), leading to an overall drop in efficiency of the coil. The reason for this is that when an identical voltage is applied to the wires simultaneously, a greater current will flow in the wires with lower inductance, and this inductance non-uniformity will work toward reducing overall efficiency of the coil.

In the coil 10 employed in the armature 100 according to an embodiment of the present invention, the presence of the twisted section 10*d* means that, as exemplarily shown in FIG. 5(*b*) or FIG. 16(*a*), when the first section of the windings 10A of the first storage section 11*a* stored in a first slot 22 is on the inner side, the last section of the windings 10A of the second storage section 11*b* stored in the second slot 22 separate from the first slot by a certain distance will be located on the outer side of the second slot 22, which reduces or suppresses the inductance non-uniformity in each part (wire) of the coil 10, so that more magnetic flux is generated.

The positional relationship between the first storage section 11a and the second storage section 11b when stored in slots 22 of the core 20 will now be described in terms of one coil 10 shown in FIG. 17. Considering the windings 10A constituting this coil 10 as divided into three groups, supposing the windings are inserted in order into the first slot 22 as shown in FIG. 17, the twisted section 10d is formed by twisting the first coil end 12a or the second coil end 12b by 180 degrees, so that the three groups of windings 10A inserted into the seventh slot 22 will be in reverse order with respect to the three groups of windings inserted into the first slot 22.

Then, a next coil receiver 10e as shown in FIGS. 5 and 6 is formed in the vicinity of the twisted section 10d of the coil 10, so that when two coils 10 are arranged in close proximity (lap winding), the twisted sections 10d will become three-dimensionally entwined and closely adhere to each other via the next coil receiver 10e, as shown in FIG. 7. Therefore, the coils 10 of the armature 100 shown in FIG. 1 are extremely close to each other, and the lengths of the first and second coil ends 12a and 12b are shortened.

If the inductance non-uniformity in each part (wire) of the coil 10 is reduced or suppressed, and the adjacent coils 10 are arranged in close proximity to each other (lap winding) so as to be three-dimensionally entwined and closely adhered to each other, an overall drop in efficiency of the coils 10 is suppressed. In addition, if the lengths of the first and second coil ends 12a and 12b of the coils 10 are shortened, the entire armature 100 will be more compact, and will exhibit almost no copper loss compared to a conventional armature. As a result, the efficiency of an electromechanical device using these coils 10 can be improved, the electromechanical device itself will have high output, and can be made smaller and lighter.

Accordingly, an armature 100 employing these coils 10 enables the following:
(C) Space factor of coils in the slots can be increased.
(D) The coil ends can be made smaller.
(E) Inductance non-uniformity in each winding can be equalized to increase efficiency.
(F) The entire coils including the coil ends can be made in a dense configuration with high thermal conductivity increasing heat dissipation.
Since the armature 100 has the aforementioned twisted sections 10d and next coil receivers 10e, it also enables the following:
(A) Manufacturing and handling of the coils themselves is easy.
(B) Insertion of the coils into the slots can be done easily.
(G) As a result, the armature can be made compact and efficient, and it is also easy to manufacture the electromechanical device having such an armature 100.

Accordingly, the armature according to claim 1 enables easy insertion of the coils 10 into the slots 22 with a high space factor, and allows for the coil ends 12a and 12b of the coils 10 to be made small, allowing for construction of an efficient electromechanical device.

In order to solve the aforementioned problems, the invention according to claim 2 employs the following means:
"A method for manufacturing an armature 100 that constitutes an electromechanical device that converts electrical and mechanical energy, the armature comprising:
a plurality of distributedly wound coils 10, each coil 10 having a first storage section 11a, a second storage section 11b, and a first coil end 12a and a second coil end 12b that electrically connect the first storage section 11a and the second storage section 11b; and
a stator core or rotor 20 having a plurality of slots 22 in which the coils 10 are stored,
the method comprising the following steps:
(1) winding windings 10A that constitute each coil 10 such that between a first radial section formed by a winding-start section 10a and a second radial section formed by a winding-end section 10b of the windings 10A, circumferential lengths of winding lap sections formed by the windings 10A change in a continuous or stepped manner;
(2) relatively rotating two robotic hands or holding tools 30 that hold one coil 10 to form a twisted section 10d in each of the first coil end 12a and the second coil end 12b;
(3) aligning exits 31 of the two robotic hands or holding tools 30 that hold the coil 10 with axial openings 23 of two respective slots 22 that are separate from each other by a certain distance;
(4) pushing the first storage section and the second storage section 11b held by the robotic hands or holding tools 30 through the exits 31 into each respective slot 22; and
(5) inserting a subsequent coil 10 into next slots 22 after the slots 22 in which the previous coil 10 is mounted, while lap winding the twisted sections 10d formed in step (2) with the twisted sections 10d of the previous coil 10, and repeating these steps."

The invention according to claim 2 is a method for manufacturing an armature 100 including a plurality of distributedly wound coils 10 and having first and second storage sections 11a and 11b, and first and second coil ends 12a and 12b that connect the first and second storage sections 11a and 11b, and a rotor 20 in which the coils are stored. This armature 100 is recited in claim 1.

In other words, the coils 10 used in the armature 100 to be manufactured according to the method recited in claim 2 must fulfill the following three important conditions:
Between a first radial section formed by a winding-start section 10a and a second radial section formed by a winding-end section 10b of the windings 10A constituting the coil, the circumferential lengths of the winding lap sections formed by the windings 10A change in a continuous or stepped manner.
In the first coil end 12a and in the second coil end 12b, a twisted section 10d and a next coil receiver 10e are formed.
The lap winding state of the twisted sections 10d and the next coil receivers 10e continues for adjacent coils 10.

In order to fulfill these conditions, in step (1) the windings 10A must be wound such that between a first radial section formed by a winding-start section 10a and a second radial section formed by a winding-end section 10b of the windings 10A constituting the coil, the circumferential lengths of the winding lap sections formed by the windings 10A change in a continuous or stepped manner. This is achieved by employing a bobbin 40 as shown in FIG. 2(*b*) (for a continuous change), or a bobbin 40 as shown in FIG. 3 (for a stepped change), as mentioned in the description of the armature 100 according to claim 1.

By winding the windings 10A that are, the material of the coil 10 around the periphery of the cylindrical or frame-shaped bobbin 40, a coil 10 having a first storage section 11a and a second storage section 11b, and a first coil end 12a and a second coil end 12b that are continuous between the first and second storage sections 11a and 11b, are formed on the bobbin 40, as shown in FIG. 2(*a*).

Next, after inserting part of the robotic hands or holding tools 30 into the insertion grooves 41 as shown in phantom in FIG. 2(b), the windings 10A constituting the first storage section 11a and the second storage section 11b are clamped by the holding tools 30. The windings 10A constituting the first storage section 11a and the second storage section 11b are thus held in parallel to each other by the holding tools 30, i.e. they are maintained in an aligned state.

Then, by moving the holding tools 30 and the bobbin 40 relative to each other while the holding tools 30 hold the first and second storage sections 11a and 11b of the windings 10A, the windings 10A constituting the first and second storage sections 11a and 11b are held in parallel to each other by the holding tools 30 as the coil 10 in which the circumferential lengths of the winding sections change in a continuous or stepped manner is removed and separated from the bobbin 40.

When the circumferential lengths of the winding-start section 10a and the winding end. section 10b of the coil 10 change in a continuous or stepped manner as described above, then when going through step (2), the windings 10A with shorter circumferential lengths will be located inwardly (nearer the end surface of each holding tool 30) of the windings 10A with longer circumferential lengths. This facilitates the formation of the twisted section 10d in the first and second coil ends 12a and 12b of the coil 10, and automatically forms a next coil receiver 10e in the vicinity of the twisted section 10d, for lap winding with another twisted section 10d.

In step (2), as shown in FIG. 5(a), when the two holding tools 30 hold the first, and second storage sections 11a and 11b while maintaining the alignment of the windings 10A, and the holding tools 30 are rotated relative to each other, the first and second coil ends 12a and 12h will project upward and downward of the coil in FIG. 5(a). Then, when the first and second coil ends 12a and 12b are twisted, the twisted section 10d is easily formed in the coil ends, and in the vicinity of this twisted section 10d a next coil receiver 10e for lap winding with another twisted section 10d is automatically formed.

In step (3), as exemplarily shown in FIG. 9, exits 31 of two robotic hands or holding tools 30 holding one coil 10 are aligned with respective axial openings 23 of two slots 22 separate from each other by a certain distance, and in step (4), as exemplarily shown in FIGS. 12 to 15, the first and second storage sections 11a and 11b held by the robotic hands or holding tools 30 are pushed into the slots 22 through the exits 31.

Then, in step (5), the twisted section 10d formed in step (2) of a next coil 10 is lap wound with the twisted section 10d of the previous coil 10, as exemplarily shown in FIG. 7. Due to this, the twisted sections 10d will, as exemplarily shown in FIG. 18, be located in a collected state in the middle between the first and seventh slots 22, and around these collected twisted section 10d there will be formed a next coil receiver 10e as shown in FIGS. 6 and 7.

In addition, in this step (5), as shown in FIG. 18, the next coil 10 is inserted into the slot 22 next to the slot 22 in which the previous coil 10 is mounted, and this process is repeated in order. Once these repetitions are finished, the armature 100 according to claim 1 will be complete.

Accordingly, the method according to claim 2 allows for manufacturing of an armature 100 that enables a compact electromechanical device, and facilitates manufacturing of the electromechanical device itself.

Effects of the Invention

As described above, the main structural features of the invention recited in claim 1 are as follows:

"An armature 100 that constitutes an electromechanical device that converts electrical and mechanical energy, the armature comprising:

a plurality of distributedly wound coils 10, each coil 10 having a first storage section 11a, a second storage section 11b, and a first coil end 12a and a second coil end 12b that electrically connect the first storage section 11a and the second storage section 11b; and a stator core or rotor 20 having a plurality of slots 22 in which the coils 10 are stored, wherein in each coil 10, between a first radial section formed by a winding-start section 10a and a second radial section formed by a winding-end section 10b of windings 10A constituting the coil 10, circumferential lengths of winding lap sections formed by the windings 10A change in a continuous or stepped manner, a first coil 10, the first storage section 11a and second storage section 11b of which are stored in two slots 22, has a twisted section 10d formed in each of its first coil end 12a and second coil end 12b, whereby sequences within the two slots 22 of the windings 10A constituting the first coil 10 are reversed with respect to each other, a second coil 10, stored in next two slots 22 after the slots 22 in which the first coil 10 is stored, has twisted sections 10d that are shifted relative to the twisted sections 10d of the first coil 10 by an amount of pitch between the respective slots 22, whereby the twisted sections 10d of the first coil 10 and the second coil 10 become three dimensionally entwined in a lap winding, and the lap winding of the twisted sections 10d continue for a third coil 10 and subsequent coils 10, such that the first coil ends 12a and the second coil ends 12b of the coils 10 are continuous without spaces at an end face of the stator core or rotor 20."Due to these features, the coil 10 can easily be inserted into the slots 22 and can have a high space factor in the slots, and has small coil ends 12a, 12b enabling provision of an armature 100 that can constitute a highly efficient electromechanical device.

Further, as described above, the main structural features of the invention recited in claim 2 are as follows:
"A method for manufacturing an armature 100 that constitutes an electromechanical device that converts electrical and mechanical energy, the armature comprising:

a plurality of distributedly wound coils 10, each coil 10 having a first storage section 11a, a second storage section 11b, and a first coil end 12a and a second coil end 12b that electrically connect the first storage section 11a and the second storage section 11b; and a stator core or rotor 20 having a plurality of slots 22 in which the coils 10 are stored, the method comprising the following steps:

(1) winding windings 10A that constitute each coil 10 such that between a first radial section formed by a winding-start section 10a and a second radial section formed by a winding-end section 10b of the windings 10A, circumferential lengths of winding lap sections formed by the windings 10A change in a continuous or stepped manner;

(2) relatively rotating two robotic hands or holding tools 30 that hold one coil 10 to form a twisted section 10d in each of the first coil end 12a and the second coil end 12b;

(3) aligning exits 31 of the two robotic hands or holding tools 30 that hold the coil 10 with axial openings 23 of two respective slots 22 that are separate from each other by a certain distance;

(4) pushing the first storage section 11a and the second storage section 11b held by the robotic hands or holding tools 30 through the exits 31 into the respective slots 22; and (5) inserting a subsequent coil 10 into next slots 22 after the slots 22 in which the previous coil 10 is mounted, white lap winding the twisted sections 10d formed in step (2) with the twisted sections 10d of the previous coil 10, and repeating these steps."

This enables manufacturing of an armature 100 that allows for the electromechanical device to be made compact, facilitating manufacturing of the electromechanical device itself.

BRIEF DESCRIPTION OF THE DRAWINGS

FIG. 1 shows a core for constructing an armature 100 according to an embodiment of the present invention, in which two coils 10 are mounted in one slot, where (a) is a plan view and (b) is a front view;

FIG. 4 shows the coil 10, where (a) is a front view of two holding tools 30 holding windings 10A when placed on one plane, and (b) is a representative plan view of seven windings 10A;

FIG. 5 shows the coil 10, where (a) is a front view of two holding tools 30 holding the windings 10A when arranged in parallel to each other, and (b) is a representative plan view of six windings 10A;

FIG. 11 shows a third step, where (a) is a partial plan view of the core 20, and (b) is an enlarged plan view of the coil 10 and the holding tools 30 at that time;

FIG. 16 illustrates the positional relationship when two coils 10 are stored in slots 22, where (a) is a partial plan view of the core 20 when the first coil 10 is inserted, and (b) is a partial plan view of the core 20 when the second coil 10 is inserted;

FIG. 20 shows a core for constructing an armature 100 according to an embodiment of the present invention, wherein one coil 10 is mounted in one slot, where (a) is a plan view and (b) is a front view;

FIG. 24 shows art proposed in Japanese Unexamined Patent Application Publication No. 2089-195005, where (a) is a perspective view of a stator and (b) is a perspective view of a coil.

DESCRIPTION OF THE EMBODIMENTS

Figure 2:
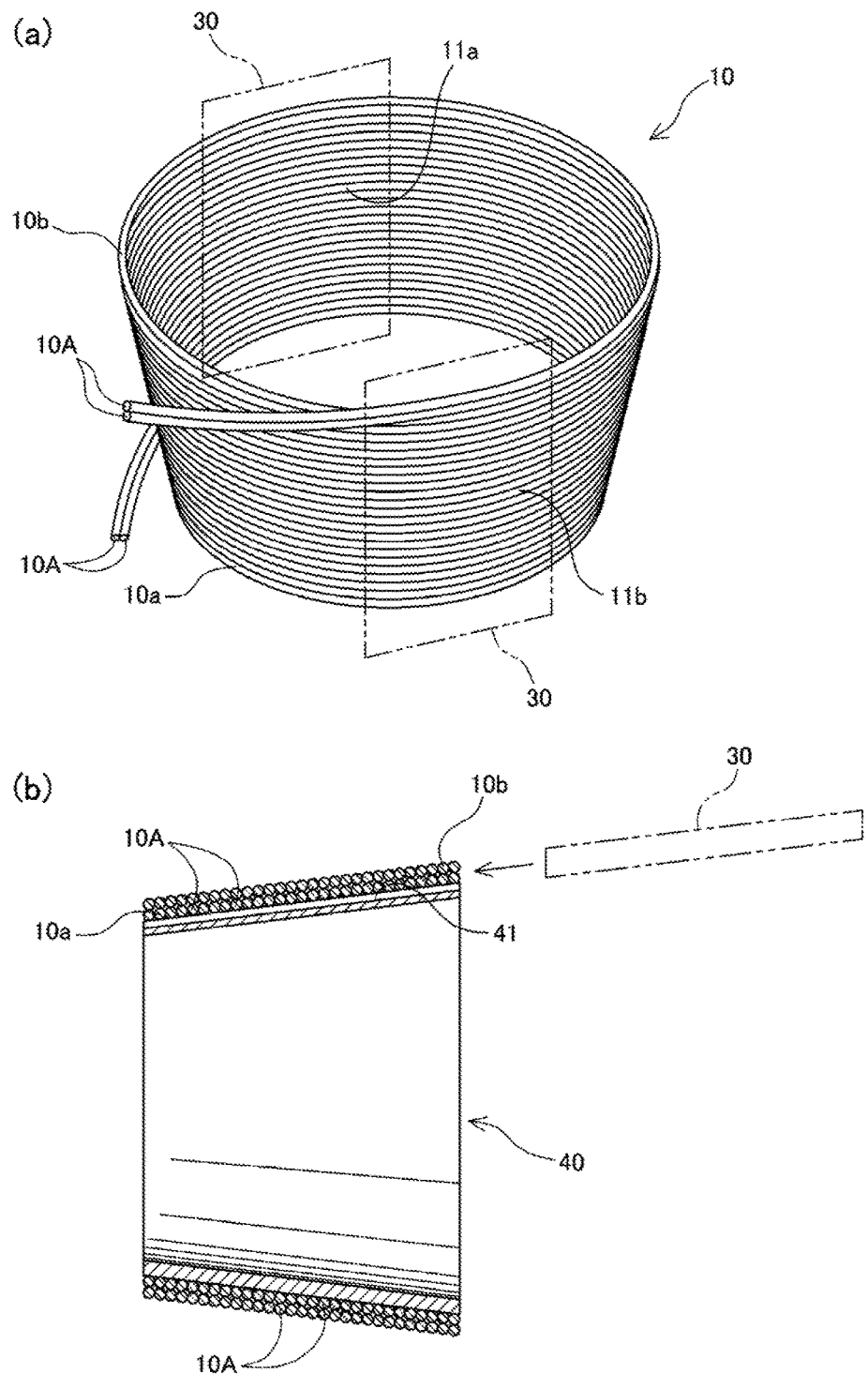
FIG. 2 schematically shows a coil 10 used in the armature 100, where (a) is a perspective view, and (b) is a cross-sectional view illustrating the manufacturing method using a bobbin 40 with a continuously changing diameter for the coil 10.

The invention recited in the claims as described above will now be described in terms of the embodiments illustrated in the drawings. FIG. 1 shows a plan view and a front view of an armature 100 employing the aforementioned coils 10, constructed by insertion of two distributedly wound coils 10 into one slot 22. Meanwhile, FIG. 20 shows a plan view and a front view of an armature 100 employing the same coils 10, constructed by insertion of one distributedly wound coil 10 into one slot 22. These armatures 100 constitute electromechanical devices that convert electrical energy and mechanical energy, such as a motor or a generator, and have a rotor not shown here stored at their center.

Although the coils 10 are manufactured and mounted onto for example the core 20 of the armature 100 shown in FIG. 1 according to a manufacturing method and mounting method described later, it goes without saying that they can also be applied to the rotor of an electromechanical device. Moreover, so long as the core 20 or rotor has a plurality of teeth 21 to which the coils 10 are mounted and slots 22 between the teeth 21, the core 20 or rotor may be of either split type or block type.

Each coil 10 has, as shown in FIGS. 2 and 4(a), first and second storage sections 11a and 11b to be stored in the slots 22 described later, and first and second coil ends 12a and 12b that are continuous between the first and second storage sections 11a and 11b and to be arranged on the outside of the core 20, wherein the sections of the coil 10 constituting the first storage section 11a and the second storage section 11b are held by two robotic hands or holding tools 30 described later. In addition, as shown in FIG. 2(b), between a first radial section formed by a winding-start section 10a and a second radial section formed by a winding-end section 10b of the windings 10A constituting the coil 10, the radii of the winding lap sections formed by the windings 10A change in a continuous (as in FIG. 2) or stepped manner (as in FIG. 3).

Figure 3:
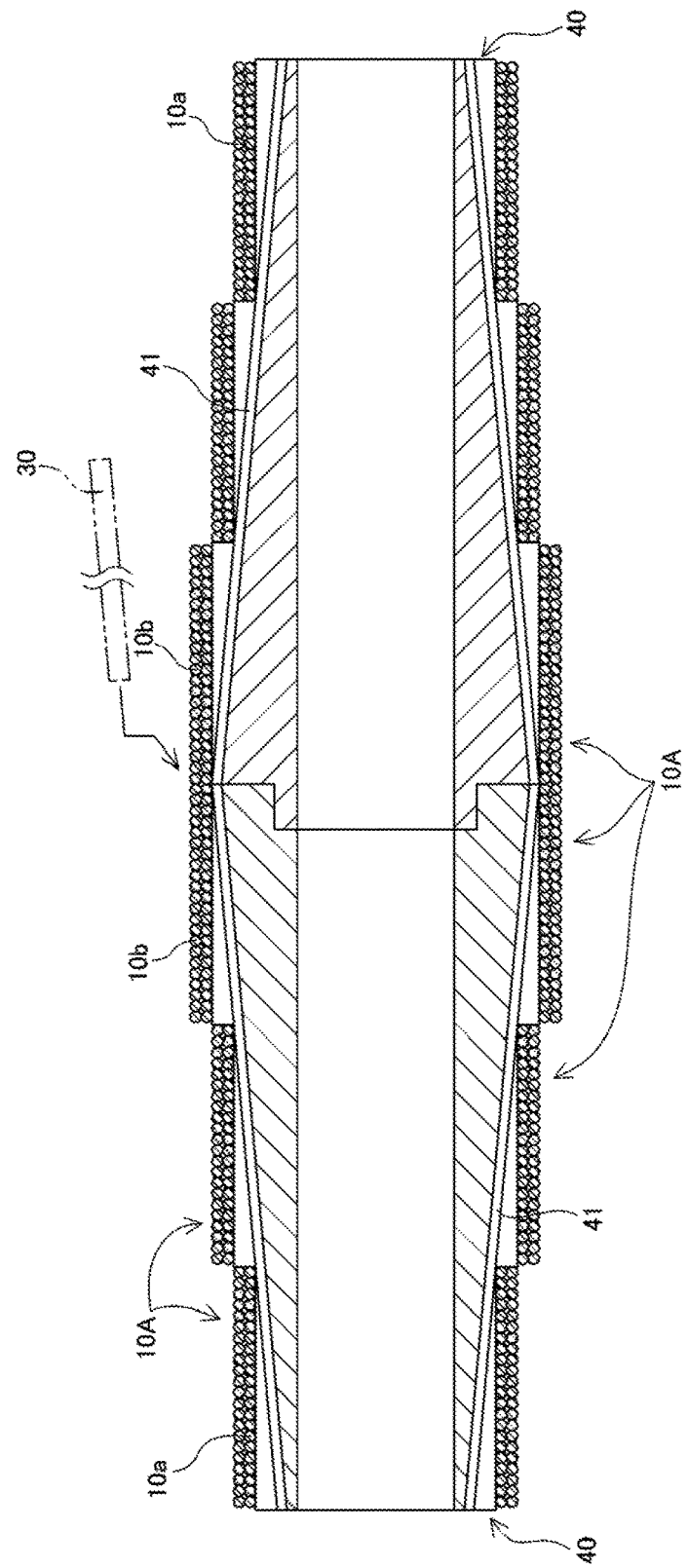
FIG. 3 is a cross-sectional view of a bobbin 40 used when manufacturing a coil 10 which has a radius that changes in a stepped manner, used in the armature 100.

The coil 10 is easily manufactured as shown in FIGS. 2(b) and 3, by winding one or more windings 10A around a bobbin 40 (FIG. 2 shows two windings 10A being wound simultaneously). Specifically, as shown in FIG. 2(b), the coil 10 is formed by winding the windings 10A around a cylinder- or frame-shaped bobbin 40 such that between a first radial section formed by a winding-start section 10a and a second radial section formed by a winding-end section 10b of the windings 10A, the radii of the winding lap sections formed by the windings 10A change in a continuous or stepped manner.

As described above, the coils 10 are formed by being wound around a bobbin 40, and can thus be manufactured without the need for a complicated manufacturing method or apparatus such as the one shown in FIG. 24.

As shown in FIG. 2(b), two insertion grooves 41 are formed in the axial direction of the bobbin 40 that causes the radii of the winding lap sections formed by the windings 10A to change in a continuous manner. Therefore, by inserting the bolding tools 30 in these insertion grooves, the windings 10A wound around this bobbin 40 will be held with the sections constituting the first and second storage sections 11a and 11b being in parallel to each other.

Each holding tool 30 used in this embodiment is made of two rectangular plates that are coupled at one side so as to be able to open and close. After inserting one of the plates into the insertion groove 41, the second plate closes on the windings 10A so as to hold the windings 10A. Accordingly, an exit 31 is formed between these two plates, and the held windings 10A can be ejected through this exit 31. Robotic hands may be used as these holding tools 30.

As these holding tools 30 are then moved relative to the bobbin 40 while holding the first and second storage sections 11a and 11b of the windings 10A, the coil 10 is removed and separated from the bobbin 40. In other words, by moving the holding tools 30 and the bobbin 40 relative to each other, the windings 10A constituting the first and second storage sections 11a and 11b of the coil 10 will be held in parallel to each other by the holding tools 30.

The manufacturing method according to this embodiment employs a plurality of bobbins 40 that are integrated in the axial direction, having the large diameter ends paired together and the small diameter ends paired together. In this case, the windings 10A can be cut off at locations other than between adjacent coils 10 so as to form a chain of two coils 10, or a chain of four coils 10 as shown in FIG. 24(b), in which the coils 10 are electrically connected at the winding-start sections 10a and winding-end sections 10b.

Meanwhile, in an embodiment where the windings 10A change in a stepped manner between the winding-start section 10a and the winding-end section 10b, a bobbin as shown in FIG. 3 is employed. FIG. 3 shows two bobbins 40 that are integrated in the axial direction with the large diameter ends paired together and the small diameter ends paired together such that the bobbins 40 continuously form cylindrical sections whose outside radii change in three steps. Of course, the surface of the cylinders forming the steps are parallel to the axial direction of the bobbins 40, such that the windings 10A wound around the cylindrical surfaces cannot be displaced. In this bobbin 40 that changes in a stepped manner, the configuration at other portions of the bobbin 40 is similar to that of the bobbin 40 shown in FIG. 2(b).

The holding tools 30 hold two sections of the newly finished coil 10, as shown in FIG. 2(a), so that the windings 10A constituting the coil 10 do not unravel. As previously described, the sections held by the holding tools 30 are referred to as the first storage section 11a and the second storage section 11b. The sections that protrude from the holding tools 30 are the first coil end 12a and the second coil end. 12b. A twisted section 10d is then to be formed in the first coil end 12a and in the second coil end 12b.

In the first coil end 12a and the second coil end 12b of the finished coil 10. the radii of the winding lap sections formed by the windings 10A change in a continuous or stepped manner between a first radial section (which is smaller) formed by the winding-start section 10a and a second radial section (which is larger) formed by the winding-end section 10b of the windings 10A, as shown in FIGS. 2 and 4(a).

Figure 6:
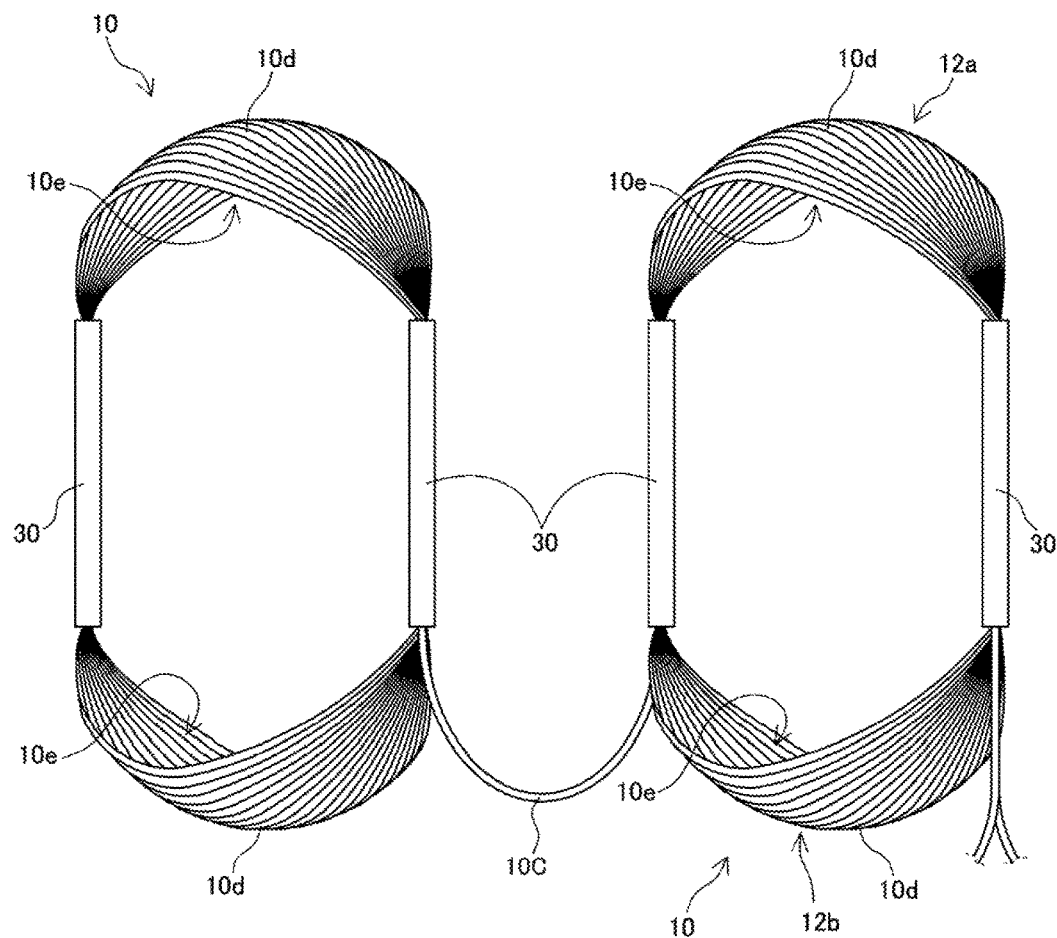
FIG. 6 is a side view of two coils 10, where the coils 10 are electrically connected by a connecting wire 10C.
Figure 7:
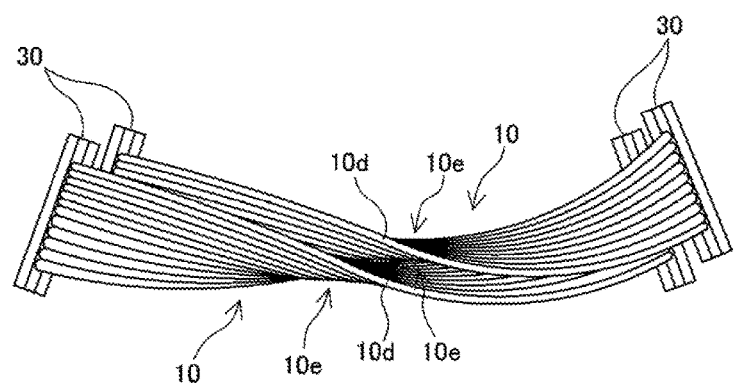
FIG. 7 is a plan view of a lap winding a twisted section 10d and a next coil receiver 10e formed in each of the two coils 10 shown in FIG. 6.

Therefore, when the holding tools 30 are relatively rotated while holding the first and second storage sections 11a and 11b, a twisted section 10d is formed in the first and second coil ends 12a and 12b as exemplarily shown in FIGS. 5 to 7. In this twisted section 10d, as the angle of rotation of the holding tools 30 increases, supposing that the winding-start section 10a has the smallest radius, the windings will be twisted into the twisted section 10d beginning with the winding-start section 10a, thereby forming a space around the twisted section 10d in which a twisted section 10d of another coil 10 can be arranged.

Then, when mounting the coil 10, the twisted section 10d of another coil 10 will fit seamlessly with the twisted section 10d of the first coil 10, such that the windings 10A will be arranged with the coil ends as short as possible, as shown in FIGS. 1(a) and 20(a). This not only reduces copper loss or iron loss in the coil ends, but, as shown in FIGS. 1(b) and 20(b), also allows for the height of the coil ends to be made significantly lower than in the example shown in FIG. 24(a), thereby allowing for the total voltage of an electromechanical device (e.g. a motor) to be made smaller.

Further, by applying a force to the center of the first coil end 12a and the second coil end 12b while they are being held in parallel to each other by the holding tools 30, a curved section 10c as shown in FIG. 21(a) will be formed. At this time, with the radii of the winding sections formed by the windings 10A changing in a continuous or stepped manner between the first radial section formed by the winding-start section 10a and the second radial section formed by the winding-end section 10b of the windings 10A, a next coil receiver 10e as shown in FIG. 21(c) can also be formed on the lower side of the first and second coil ends 12a and 12b. When mounting the coil 10, the next coil receiver 10e of another coil 10 will be inserted into the next coil receiver 10e. This not only reduces copper loss or iron loss in the coil ends, but, as shown in FIGS. 1(b) and 20(b), also allows for the height of the coil ends to be made significantly lower than in the example shown in FIG. 24(a).

The coils 10 made as described above are inserted into the slots 22 formed between the teeth 21 of the core 20. There are two exemplary types of insertion methods or mourning methods: A one slot-one coil type, and a one slot-two coils type. These methods will be described individually below.

(One Slot-One Coil Mounting Method)

Figure 17:
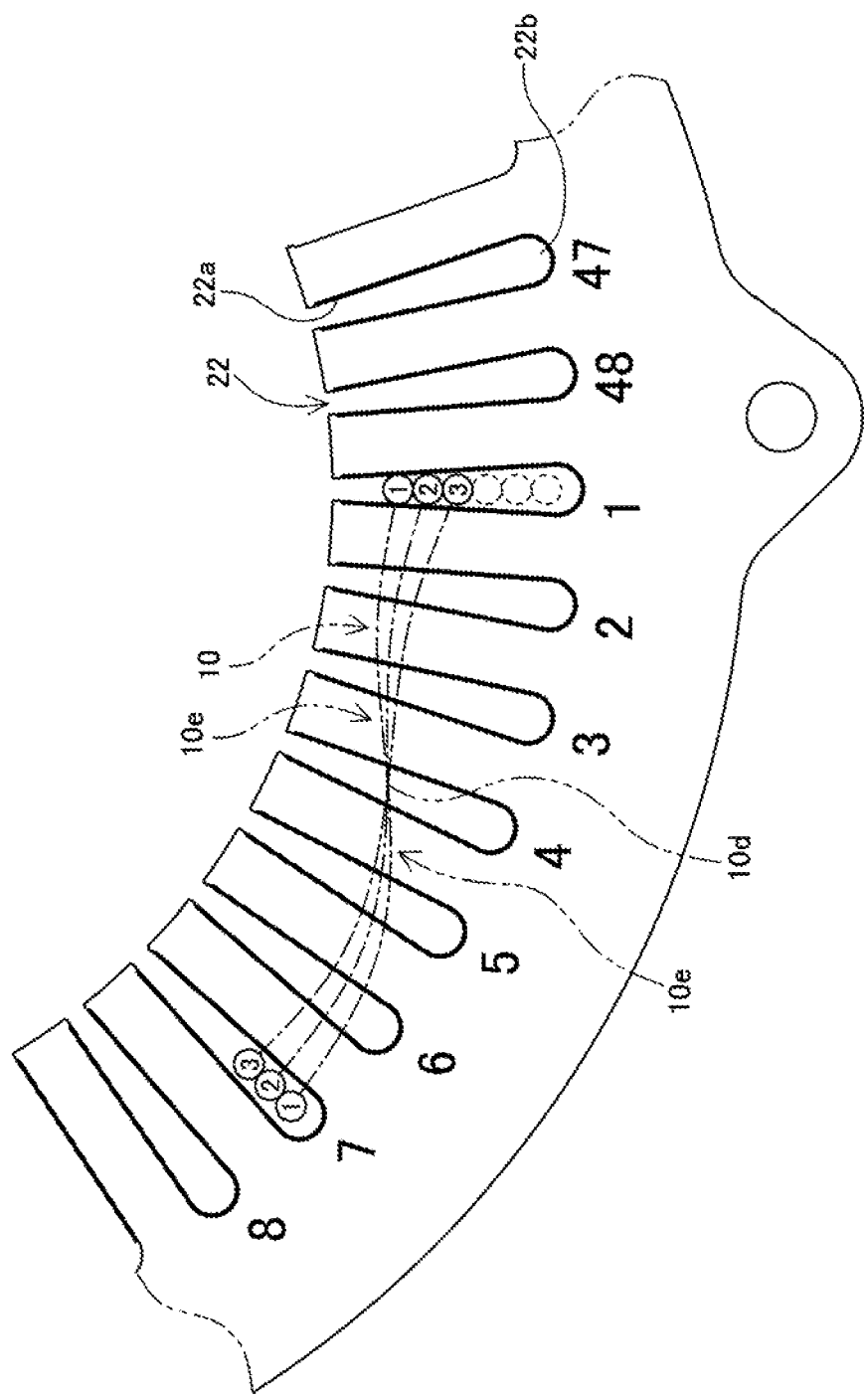
FIG. 17 is a partial enlarged plan view of the core 20 illustrating how in a case where the storage sections 11a and 11b are respectively stored in the first and seventh slots 22, when a twisted section 10d and a next coil receiver 10e are formed for example at the first coil end 12a, the order of the three sections of the plurality of windings 10A is reversed.
Figure 18:
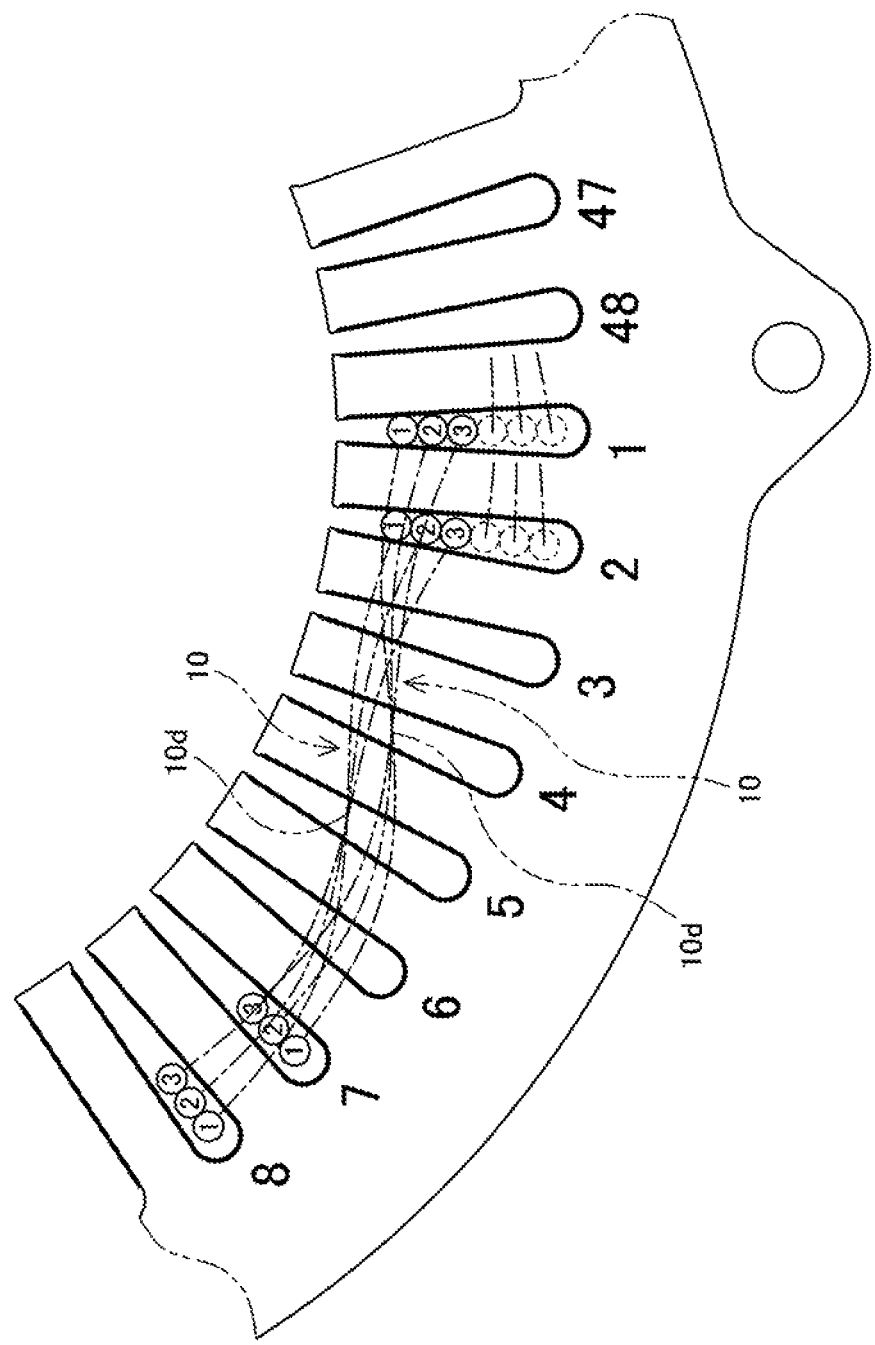
FIG. 18 is an enlarged partial plan view of the core 20 illustrating how the storage sections 11a and 11b of a second coil 10 are respectively stored in the second and eighth slot 22.
Figure 21:
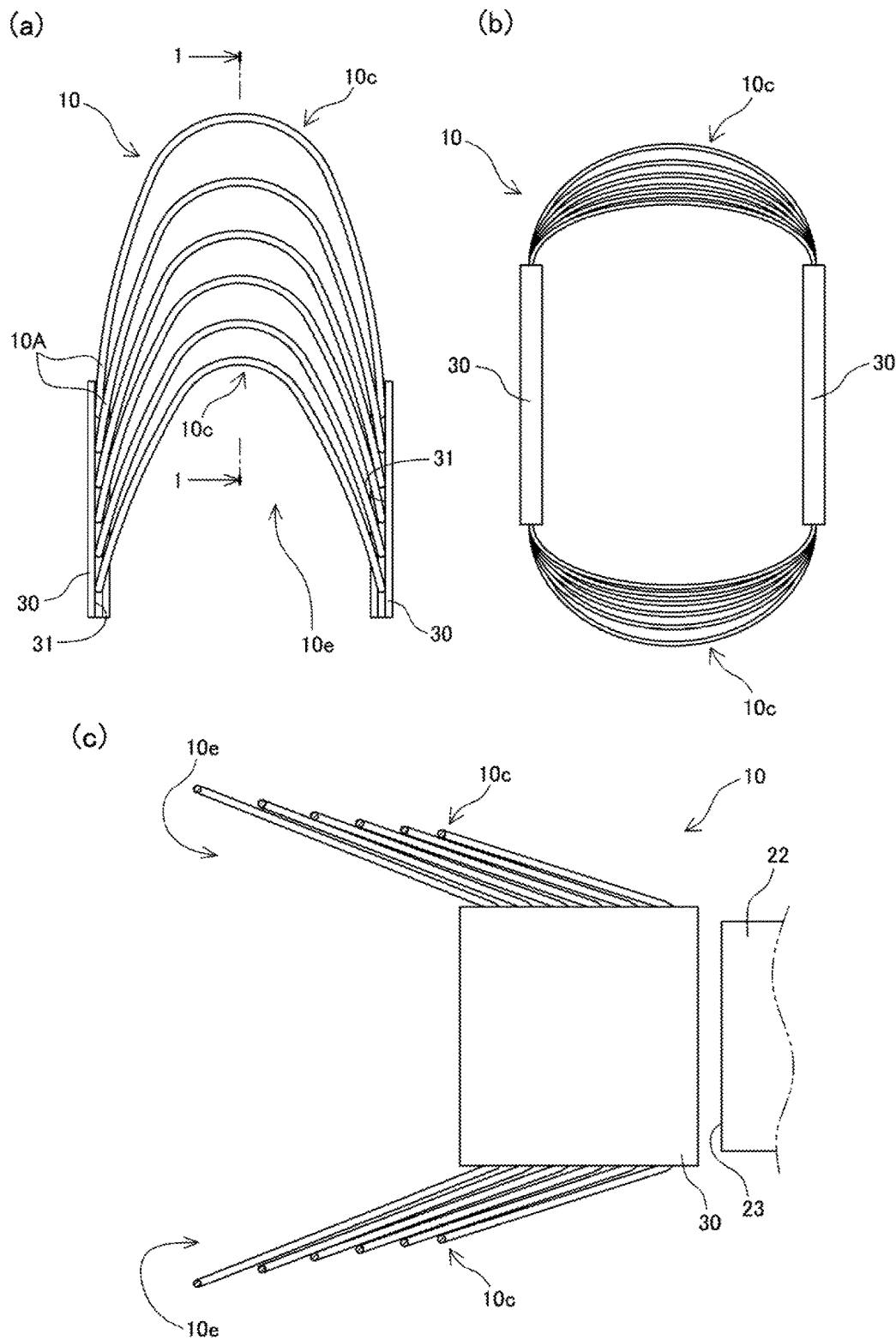
FIG. 21 shows a coil 10 for constructing the armature 100 according to the embodiment of the present invention, the coil 10 having curved sections 10c and next coil receivers 10e, where (a) is an enlarged plan view of two holding tools 30 arranged in parallel, (b) is a front view of same, and (c) is a cross-sectional view taken along line 1-1 in (a)

In this type of mounting method, one coil 10 is inserted into one slot 22 of the core 20 of an electromechanical device, as shown in FIG. 17, with the aim of making an armature 100 as shown in FIG. 20. First, as shown in FIG. 21, a curved section 10c is formed in each of the first and second coil ends 12a and 12b located between two holding tools 30 holding one coil 10.

As a result, as shown in FIG. 21(a) to (c), since the first radial section formed by the winding-start section 10a and the second radial section formed by the winding-end section 10b of the windings 10A change in a continuous or stepped manner with respect to the holding tools 30, a next coil receiver 10e in which the winding-end section 10b is the widest opening is naturally formed on the lower side of the curved section 10c between each of the first and second coil ends 12a and 12b and the holding tools 30, as shown in FIG. 21(c).

Employing the coil 10 in which this curved section 10c is formed, the exits 31 of the holding tools 30 holding the first coil 10 are aligned with the axial openings 23 of two respective slots 22 that are separate from each other by a specific distance. Next, the first and second storage sections 11a and 11b held by the respective holding tools 30 are pushed into the slots 22 through the exits 31.

The next coil 10 is then inserted into the next slot 22 after the slot 22 in which the first coil 10 is mounted, such that the curved section 10c of the next coil 10 is inserted in the curved section 10c of the first coil 10. Since the second coil 10 in this case also has a curved section 10c, this curved section 10c will be stored without spaces within the curved section 10c of the first coil 10.

Figure 22:
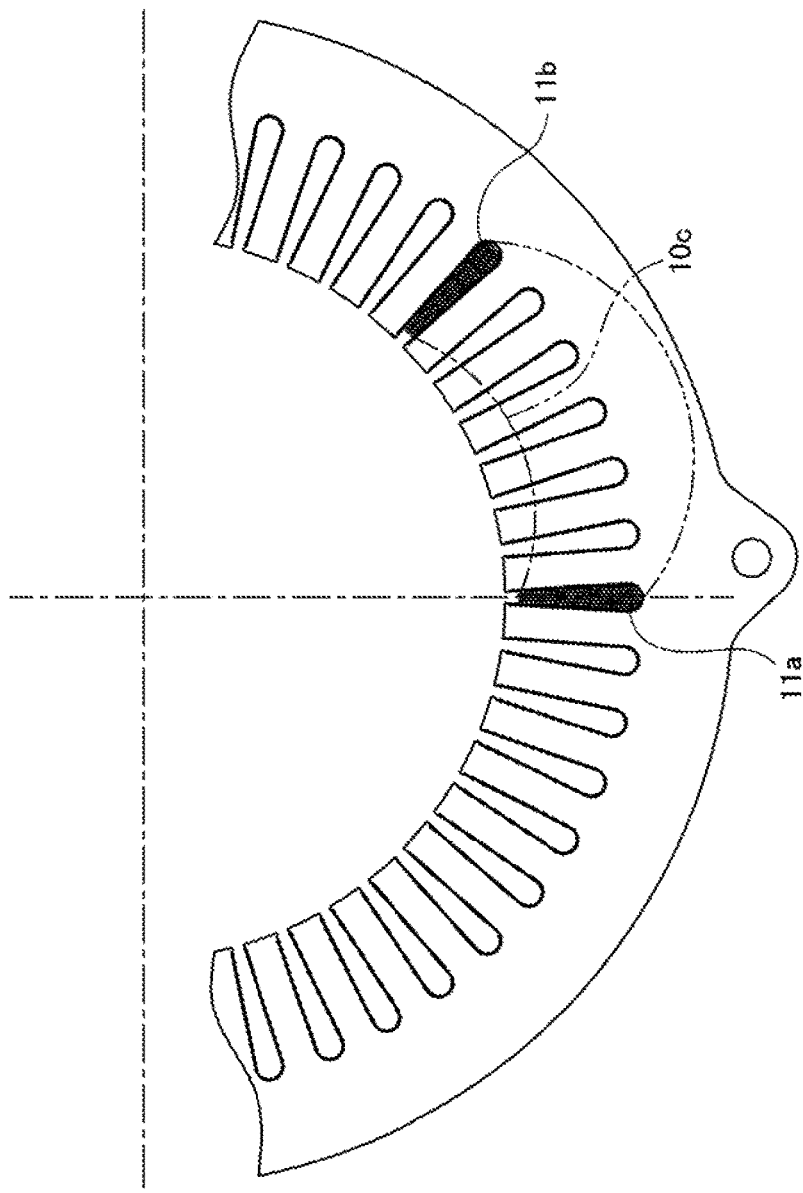
FIG. 22 is a partial plan view of the core 20 illustrating the positional relationship when one coil 10 is stored in one slot 22.
Figure 23:
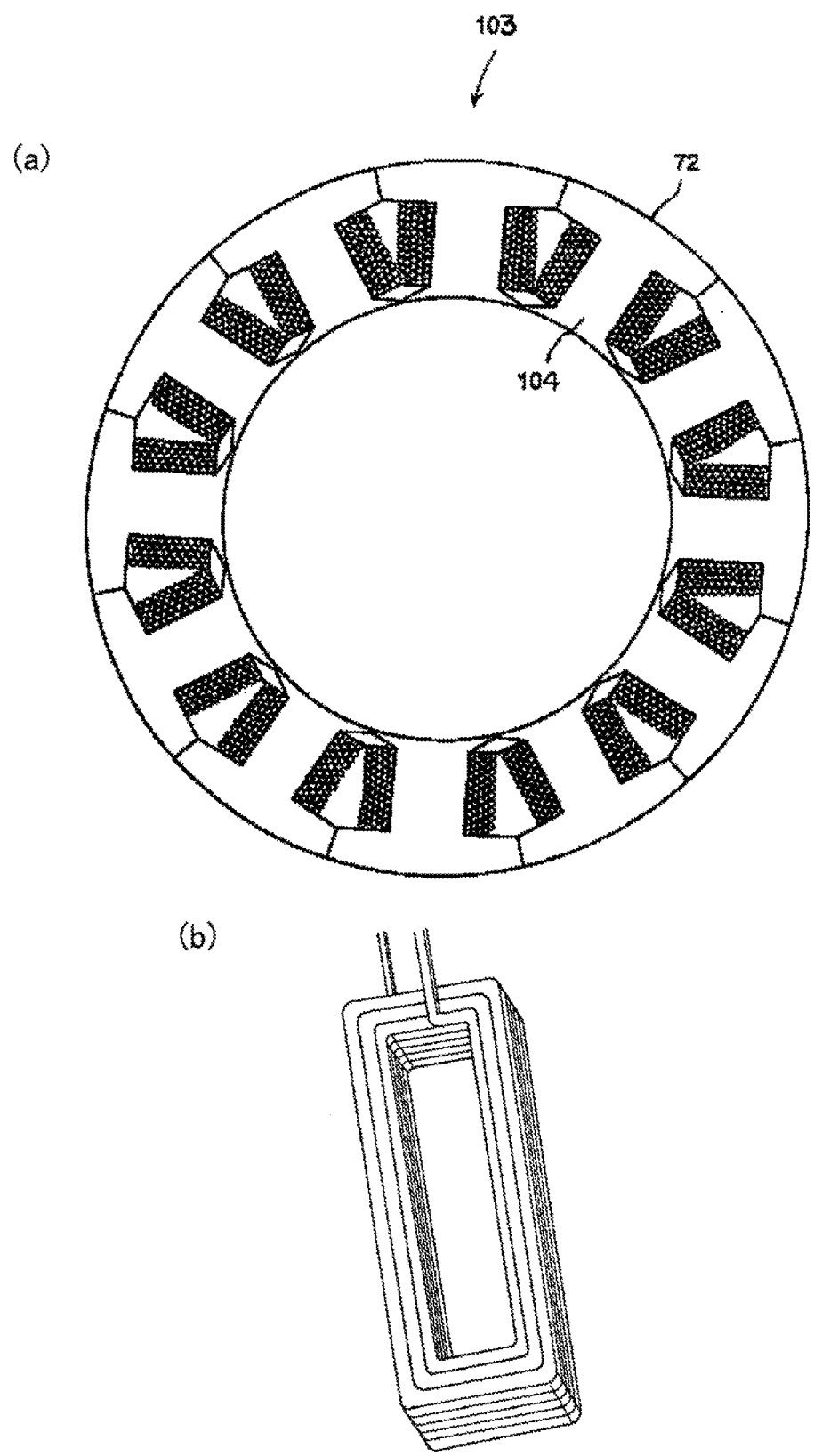
FIG. 23 shows art proposed in Japanese Unexamined Patent Application Publication No. 1999-312621, where (a) is a plan view of a stator, and (b) is a perspective view of a coil.
Figure 25:
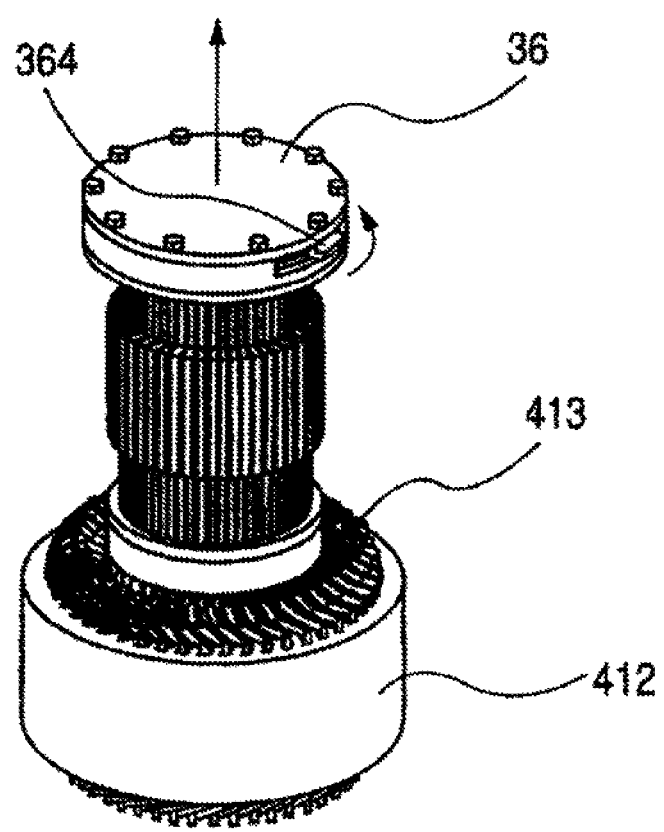
FIG. 25 is a perspective view of a coil insertion device proposed in Japanese Patent No. 5394058.

When subsequent coils 10 are mounted in a similar manner onto a core 20, the curved sections 10c of for example the first coil ends 12a protrude inwardly, where the rotor of the core 20 is to be arranged, and the curved sections 10c are therefore bent toward the opposite side, as shown in FIGS. 21(c) and 22. In a case where the coils 10 are mounted onto a rotor, the curved sections 10c of the first and second coil ends 12a and 12b do not need to be bent, as they protrude toward the center.

The curved sections 10c in this one slot-one coil method correspond to the next coil receivers 10e of the one slot-two coils method described below.

(One Slot-Two Coils Mounting Method)

This type of mounting method differs from the one slot-one coil type method described above. As shown in FIG. 16, the first storage section 11a of a first coil 10 and the second storage section 11b of a second coil 10 are inserted or mounted in each of a plurality of slots 22 of a rotor 20, with the aim of making an armature 100 as shown in FIG. 1. In this mounting method, as shown in FIG. 16(a), the first and second storage sections 11a and 11b of the first coils 10 are respectively stored in a first slot 22, and another slot 22 separate from the first slot 22 by a specific distance. At this time, the windings 10A constituting the first and second storage sections 11a and 11b are in an unraveled state within the slots 22, leaving space for the insertion of the first and second storage sections 11a and 11b of subsequent coils 10.

In this mounting method, the exit 31 of the holding tool 30 holding the first storage section 11a of the coil 10 is aligned with the axial opening 23 of one slot 22, and the first storage section 11a is inserted into the slot 22, in a case where the second storage section 11b of another coil 10 has not yet been inserted into the slot 22, the windings 10A constituting the first storage section 11a will be stored in an unraveled state in the slot 22, so that when the second storage section 11b of a subsequent coil 10 is forcefully inserted into the slot 22, the first storage section 11a of the first coil 10 and the second storage section 11b of the subsequent coil 10 will be packed tightly together. Insertion is carried out by means of an ejecting plate that pushes out the windings 10A from the holding tool 30, but it can also be carried out automatically by the elastic force inherent in the windings 10A.

Next, by twisting the holding tool 30 holding the second storage section 11b of the coil 10 relative to the holding tool 30 holding the first storage section 11a, a twisted section 10d as exemplarily shown in FIG. 5 is formed in the first coil end 12a and in the second coil end 12b. This twisted section 10d is formed by such relative rotation of two holding tools 30 in the state shown in FIG. 2(a).

When this twisted section 10d is formed, between a first radial section formed by a winding-start section 10a and a second radial section formed by a winding-end section 10b of the windings 10A, the radii of the winding lap sections formed by the windings 10A change in a stepped manner. Therefore, in the twisted section 10d, the winding sections will be twisted, in upward order, from the winding section with the smallest radius to the winding section with the largest radius, and around the first coil end 12a and second coil end 12b of the first coil 10 will be formed a space, in other words a next coil receiver 10e, in which a twisted section 10d of a second coil 10 can be arranged in a closely adhered state, as shown in FIGS. 5 and 16(b).

Next, the exit 31 of the holding tool 30 holding the second storage section 11b of the coil 10 is aligned with the axial opening 23 of another slot 22 separate from the aforementioned slot 22, and the second storage section 11b is pushed into this slot 22 by the ejecting plate of the holding tool 30.

The next coil 10 is then inserted into the other slot 22 separate from the slot 22 in which the previous coil 10 is mounted, while the twisted section 10d and next coil receiver 10e formed through the aforementioned process are overlapped with the twisted section 10d and next coil receiver 10e of the previous coil 10. This process is then repeated.

At this time, the center of the twisted section 10d of the previous coil 10 is more constricted due to the twisting than the peripheral sections, such that the peripheral sections of the twisted section 10d are in an expanded state. Therefore, in the vicinity of the twisted section 10d of the coil 10 there will be formed a space, in other words a next coil receiver 10e. The twisted section 10d of the next coil 10, which is to be inserted into a next slot 22 separate from the first slot 22 by the pitch between the slots 22, is to be stored in this next coil receiver 10e in a closely adhered state. In other words, the twisted section 10d of the next coil 10 is arranged so as to be entwined with the twisted section 10d of the previous coil 10, and when insertion of the previous coil 10 and the adjacent next coil 10 is finished, the twisted sections 10d and next coil receivers 10e are in a closely adhered state.

In the final step of the insertion process where two distributedly wound coils 10 are inserted into a plurality of slots 22 in the "one slot-two coils" configuration, there will naturally be cases where the previously inserted coils 10 become obstructions. By final step is meant a step in which, when the first storage sections 11a of the first to seventh coils 10 are inserted in order into the first to seventh slots 22, respectively, the second storage sections 11b of the final $n^{th}$ to n-$6^{th}$ coils 10 are inserted into the final $n^{th}$ to n-$6^{th}$ slots 22.

Thus, in the final step of the insertion process, with respect to a slot 22 into which the second storage section 11b is to be inserted but a first storage section 11a of the previous coil 10 has already been inserted, the first storage section 11a is temporarily taken out and the second storage section 11b of the next coil 10 is inserted and pushed into the outer side of the slot 22, while the first storage section 11a is reinserted so as to be at the inner side.

Figure 8:
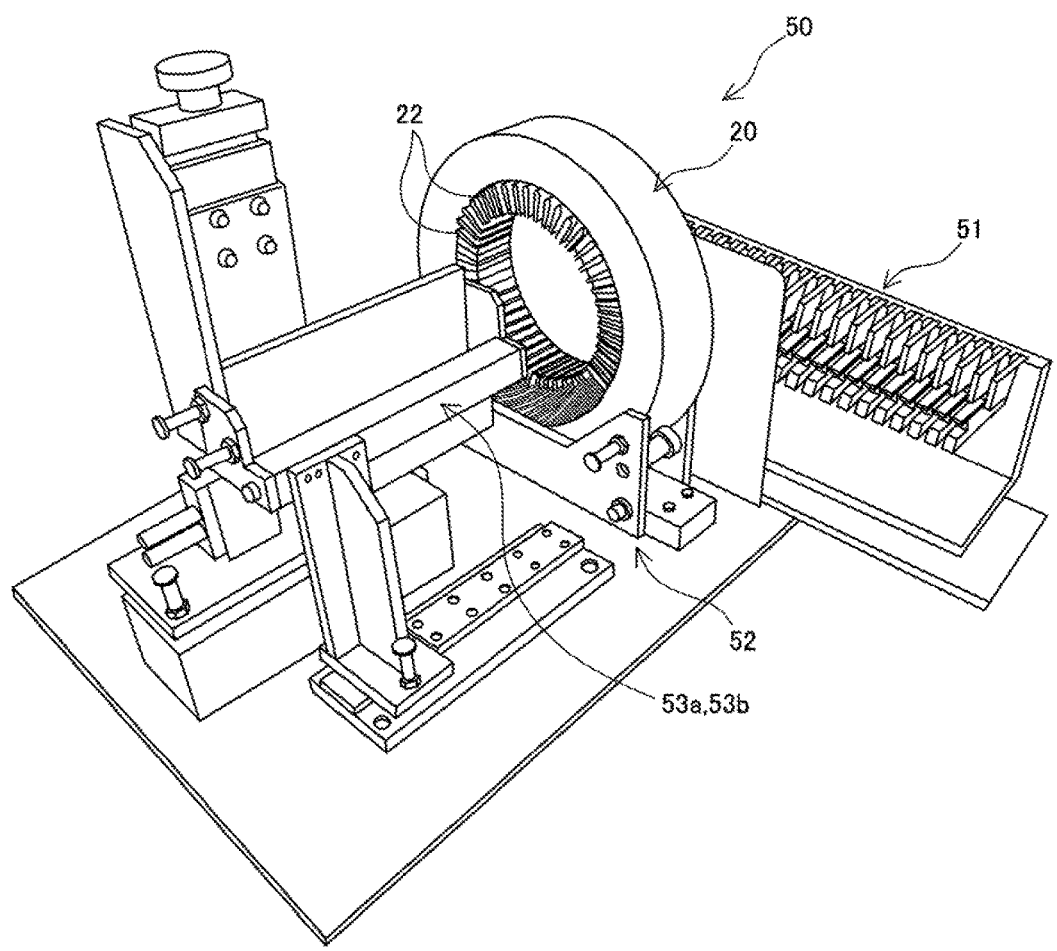
FIG. 8 is a general perspective view of a coil mounting device 50 for mounting the coils 10 in the slots 22.

A coil mounting device 50 as shown in FIG. 8 is used for the insertion of the coils 10 into the slots 22. This coil mounting device 50 includes a coil shelf 51 that can accommodate a plurality of coils 10 held in holding tools 30 and a core rotator 52 that sequentially rotates and positions the core 20, and is configured to transport the coils 10 held in the holding tools 30 from the coil shelf 51 to the core 20 supported by the core rotator 52. The coils 10 are stored in the coil shelf 51 in a manner shown in FIG. 4.

The coil mounting device 50 additionally includes a first assist arm 53a and a second assist arm 53b, which are individually rotated and moved into and out of the core 20 on the core rotator 52, and are configured to operate depending on the state of the coils 10 so as to twist for example the second storage section 11b of each coil 10 to form the twisted section 10d.

Insertion of the coils 10 into the slots 20 using the coil mounting device 50 will be described below with reference to FIGS. 9 to 20.

This embodiment shows an example of a one slot-two coil insertion process in which a first storage section 11a of one coil 10 and a second storage section 11b of another coil 10 are stored in each of 48 slots 22 of a core 20. As exemplarily shown in FIG. 12(a), the first storage section 11a of the first coil 10 is stored in the first slot 22, and the second storage section 11b of the coil 10 is stored in the $43^{rd}$ slot 22 in the clockwise direction. In other words, a process of distributed winding is carried out, in which the first and second storage sections 11a and 11b of one coil 10 are stored in two slots 22 across five other slots 22.

First, a required number of coils 10 are stored oil the coil shelf 51 of the coil mounting device 50 shown in FIG. 8. The coils 10 are in the state shown in FIG. 9(b), in which one of the holding tools 30 is rotated relative to the other one such that the first and second storage sections 11a and 11b are aligned in a straight line. The required number of coils 10 is set in the coil shelf 51 by storing two holding tools 30 holding one coil 10 in this state in each gap of the coil shelf 51.

Figure 9:
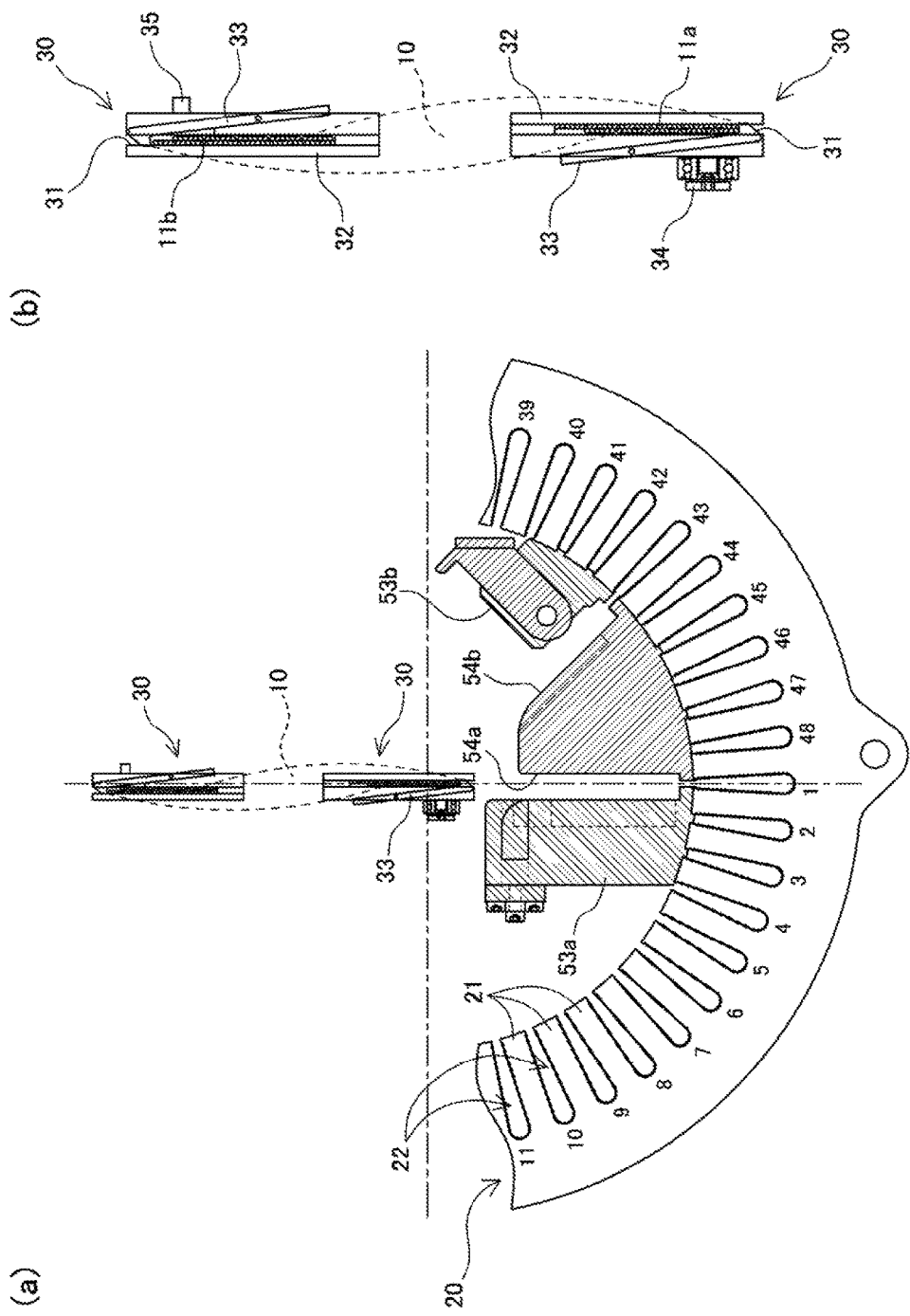
FIG. 9 shows a first of seven steps of a process in which one coil 10 is inserted in two slots 22 by the coil mounting device 50, where (a) is a partial plan view of the core 20, and (b) is an enlarge plan view of the coil 10 and the holding tools 30 at that time.
Figure 10:
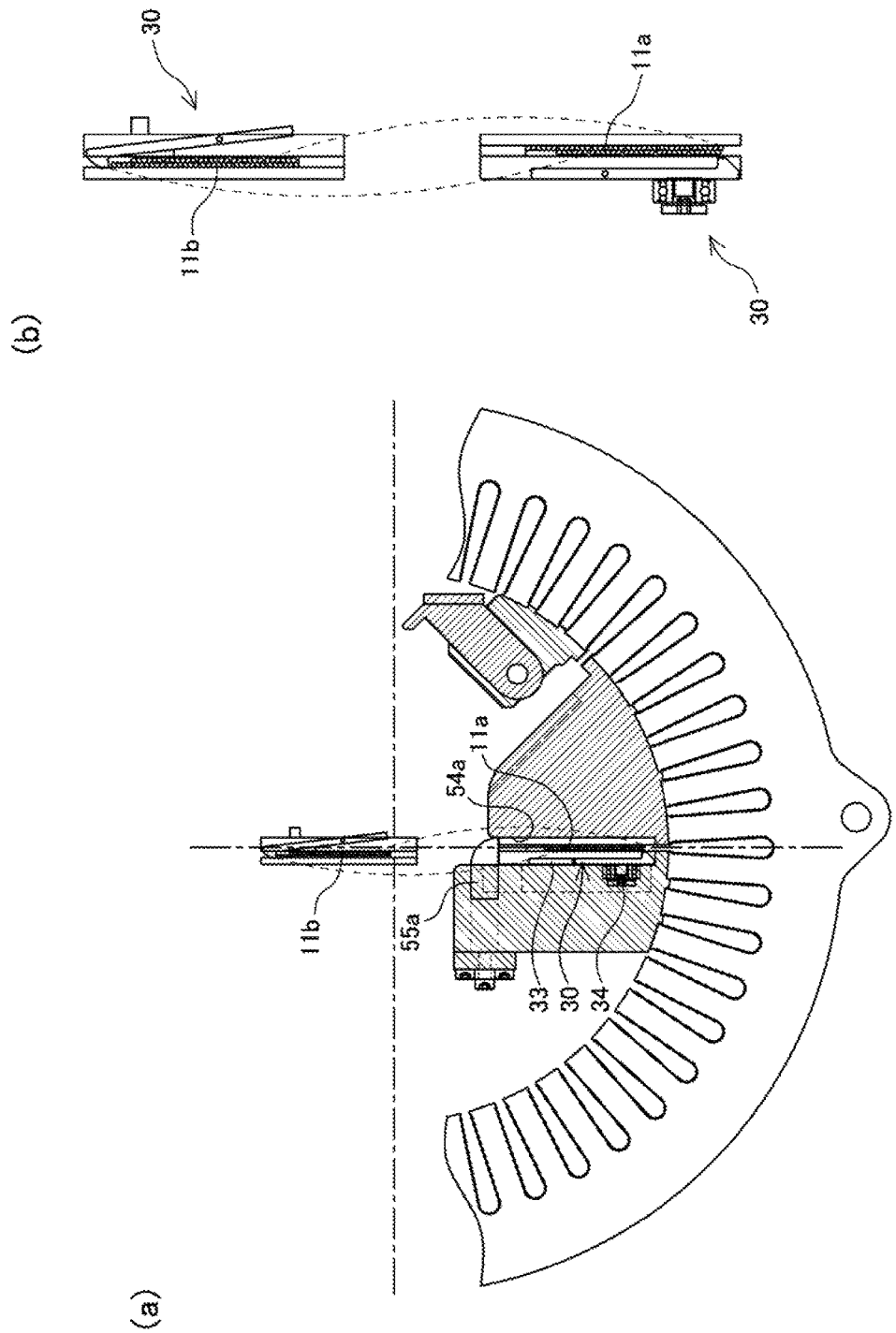
FIG. 10 shows a second step, where (a) is a partial plan view of the core 20, and (b) is an enlarged plan view of the coil 10 and the holding tools 30 at that time.

Next, as shown for example in FIG. 9(a), the coil mounting device 50 is operated with respect to the core 20 having first to $48^{th}$ slots 22 so that the holding tool 30 holding the first storage section 11a of the first coil 10 faces the first slot 22. At this time, as shown in FIG. 9(a), the tip of the first assist arm 53a is moved into the core 20 such that a first guide channel 54a formed at the tip of the first assist arm 53a faces the first slot 22, and the second storage section 11b of the coil 10 is on standby outside of the guide channel 54a (at the upper side of FIG. 9).

In the state shown in FIG. 9, the two holding tools 30 that were stored horizontally in the coil shelf 51 are rotated 90 degrees to a vertical position. In other words, the two holding tools 30 aligned in a vertical line are orthogonal to the axial opening 23 of the slot 22. In the state shown in FIG. 9, particularly in FIG. 9(a), the tip of the second assist arm 53b having a second guide channel 54b is arranged to the right of the first assist arm 53a such that the second guide channel 54b faces the $43^{rd}$ slot 22 and is standing by to store the second storage section 11b of the first coil 10.

Looking more closely at the state of the first coil 10, as shown in FIG. 9(b), the first storage section 11a is sandwiched between a base plate 32 and a swinging plate 33 at the lower side of the drawing. The lower end of the first storage section 11a is held by the tip of the closed swinging plate 33 such that the first storage section 11a cannot leave through the exit 31. Meanwhile, the holding tool 30 holding the second storage section 11b of the coil 10 on the upper side of the drawing has its exit 31 at the top end, which exit 31 is also closed by a closed swinging plate 33. The portions other than the first and second storage sections 11a and 11b held by the holding tools 30 are the first and second coil ends 12a and 12h, in which a twisted section 10d has already been formed by relative rotation of the holding tools 30.

Next, the coil mounting device 50 is operated so that, as shown in FIG. 10(a), the holding tool 30 holding the first storage section 11a is inserted into the first guide channel 54a of the first assist arm 53a. Since this first guide channel 54a is a long, straight groove, the swinging plate 33 is pushed against the biasing force of the first engaging pin 34 so that the swinging plate 33 becomes parallel to the base plate 32, which opens the exit 31 of the lower holding tool 30 as shown in FIG. 10(b).

Once the entire lower holding tool 30 is stored in the first guide channel 54a, a first stopper 55a provided at the first assist arm 53a closes the upper portion of the first, guide channel 54a, so that the first storage section 11a of the coil 10 will not accidentally pop out of the first guide channel 54a. At this time, the upper holding tool 30 holding the second storage section 11b will be brought closer to the end of the first assist area 53a.

Figure 12:
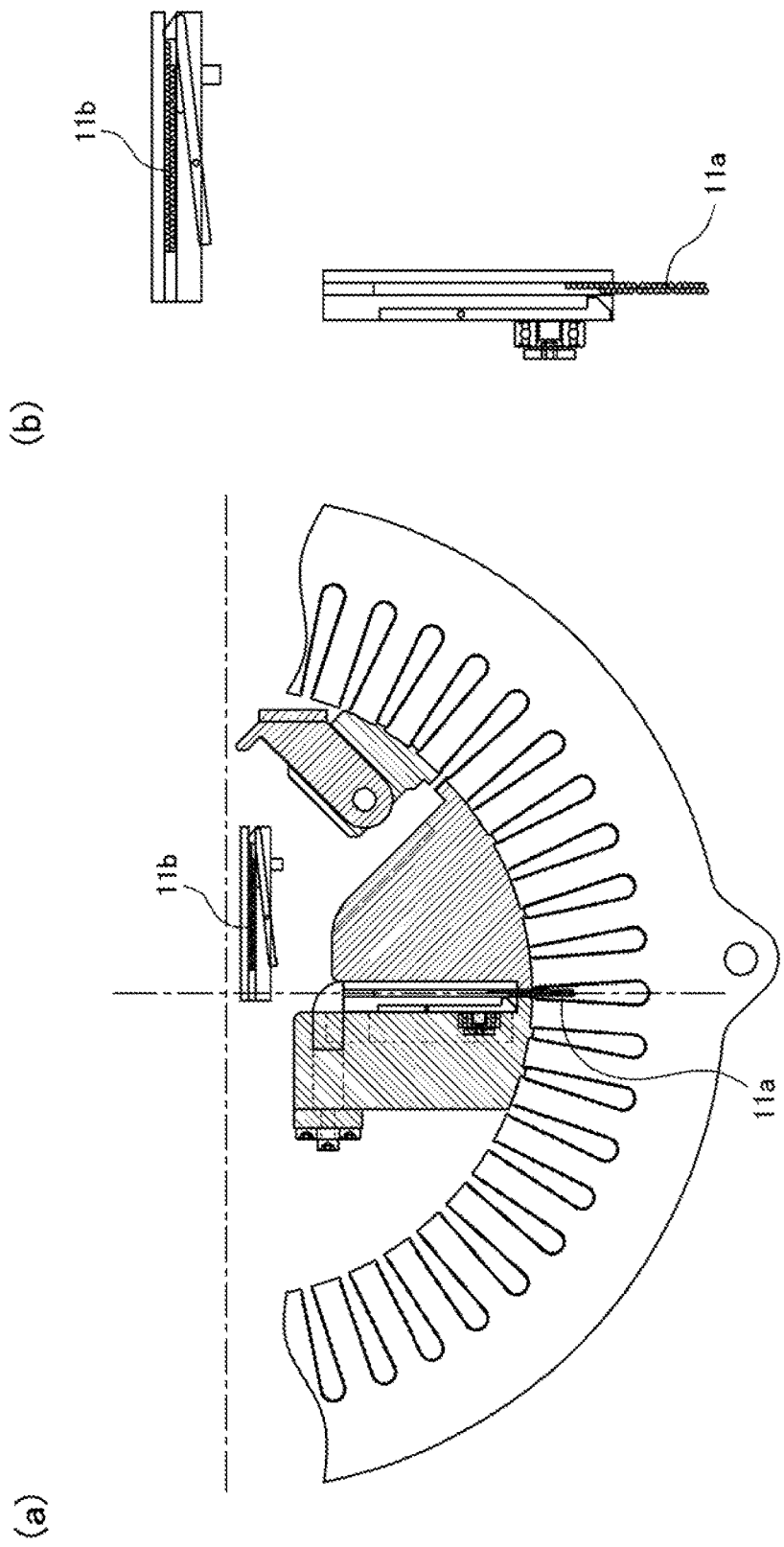
FIG. 12 shows a fourth step, where (a) is a partial plan view of the core 20, and (b) is an enlarged plan view of the coil 10 and the holding tools 30 at that time.
Figure 13:
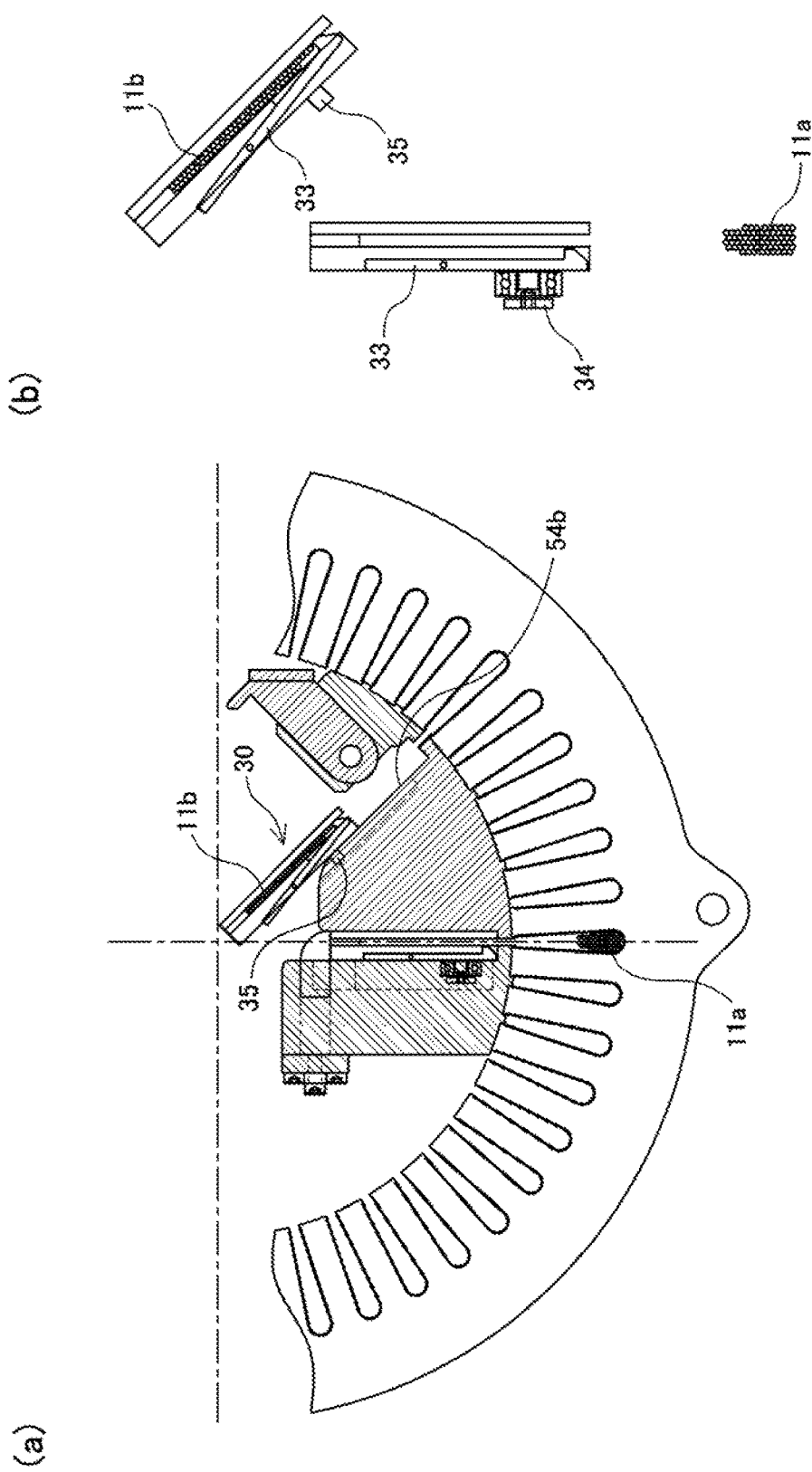
FIG. 13 shows a filth step, where (a) is a partial plan view of the core 20, and (b) is an enlarged plan view of the coil 10 and the holding tools 30 at that time.

Now, as the upper holding tool 30 is rotated in a clockwise direction, the first storage section 11a that was held inside the lower holding tool 30 begins to enter the first slot 22 and the exit 31 of the upper holding tool 30 is rotated to face the second guide channel 54b, as shown in FIGS. 11 to 13. The first storage section 11a of the coil 10 begins to enter the first slot 22 due to the force from the second storage section 11b connected via the first and second coil ends 12a and 12b as the upper holding tool 30 is rotated in the clockwise direction. Of course, the first storage section 11a may be pushed into the slot 22 by other means.

Figure 14:
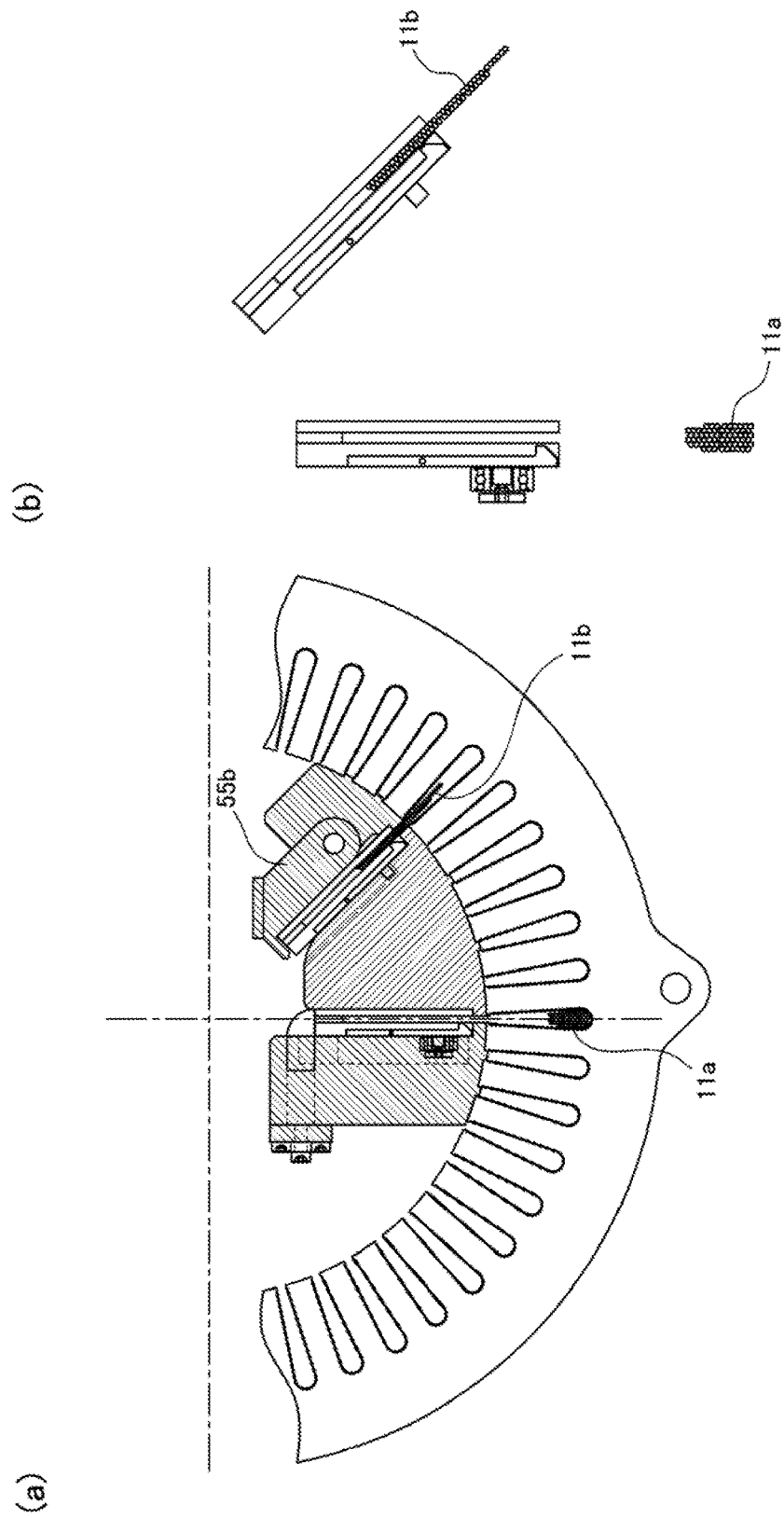
FIG. 14 shows a sixth step, where (a) is a partial plan view of the core 20, and (b) is an enlarged plan view of the coil 10 and the holding tools 30 at that time.
Figure 15:
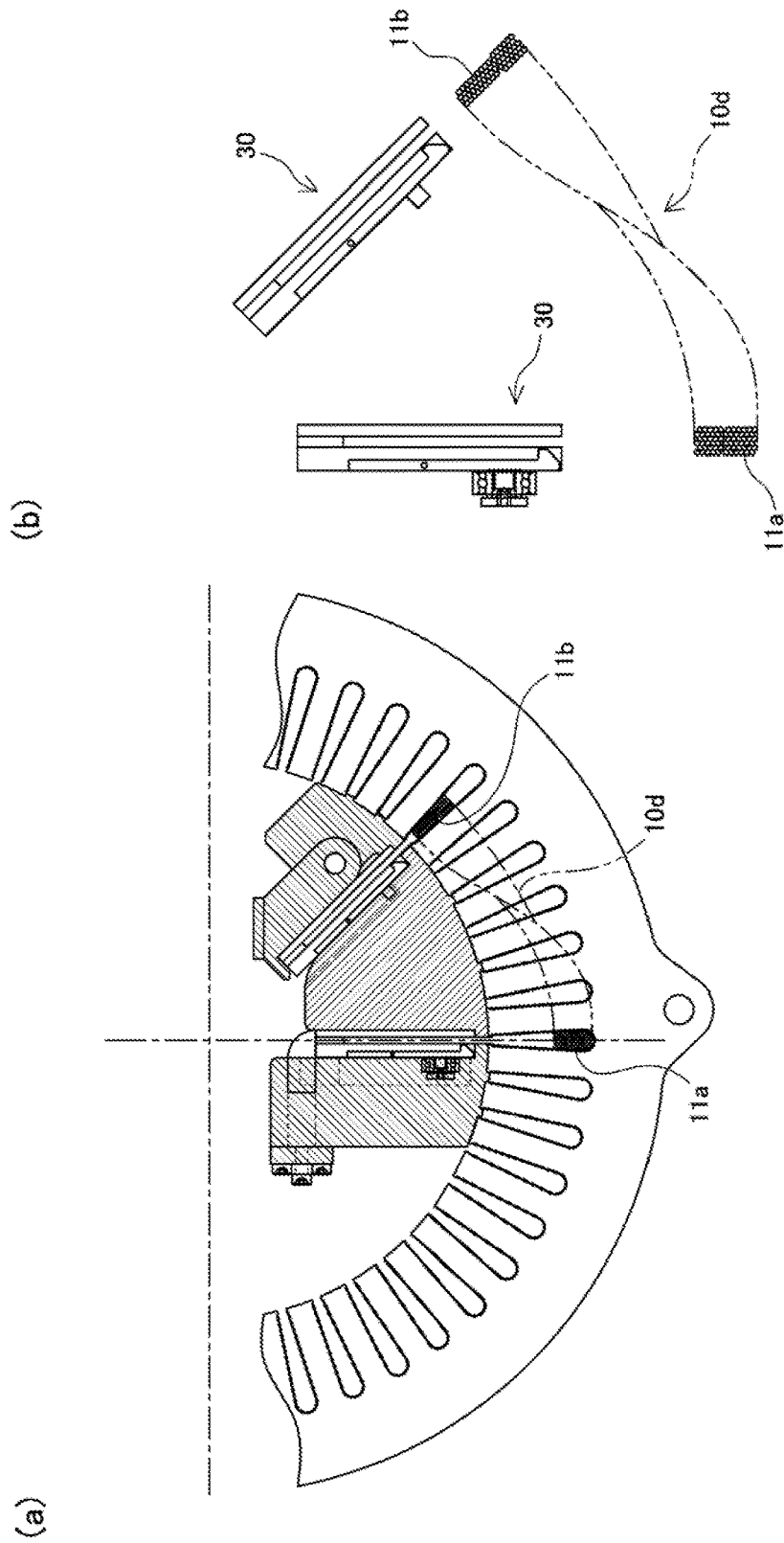
FIG. 15 shows a seventh and final step, where (a) is a partial plan view of the core 20, and (b) is an enlarged plan view of the coil 10 and the holding tools 30 at that time.

As shown in FIG. 13, when the holding tool 30 holding the second storage section 11b is brought to the opening of the second guide channel 54b by the coil mounting device 50, it is pushed further into the second guide channel 54b while being guided by the second engaging pin 35. At this time, the first storage section 11a is almost entirely in the outer side of the respective slot 22. When the second storage section 11b is pushed into the slot 22 as shown in FIG. 14, the closed state of the swinging plate 33 of the holding tool 30 is released, opening the exit 31 so that the second storage section 11b enters the $43^{rd}$ slot 22. A second stopper 55b then closes the opening of the second guide channel 54b.

When insertion of the second storage section 11b is carried out to its final step, the second storage section 11b completely enters the slot 22, and the twisted section 10d between the first and second storage sections 11a and 11b will span across five slots 22, as shown in FIG. 15(a). By repeating the process described above as shown in FIGS. 16(a) and (b), the first storage section 11a of the first coil 10 be stored at the outer side of the first slot 22, while the second storage section 11b of the sixth coil 10 will be stored at the inner side of the first slot 22, as shown in FIG. 19.

Figure 19:
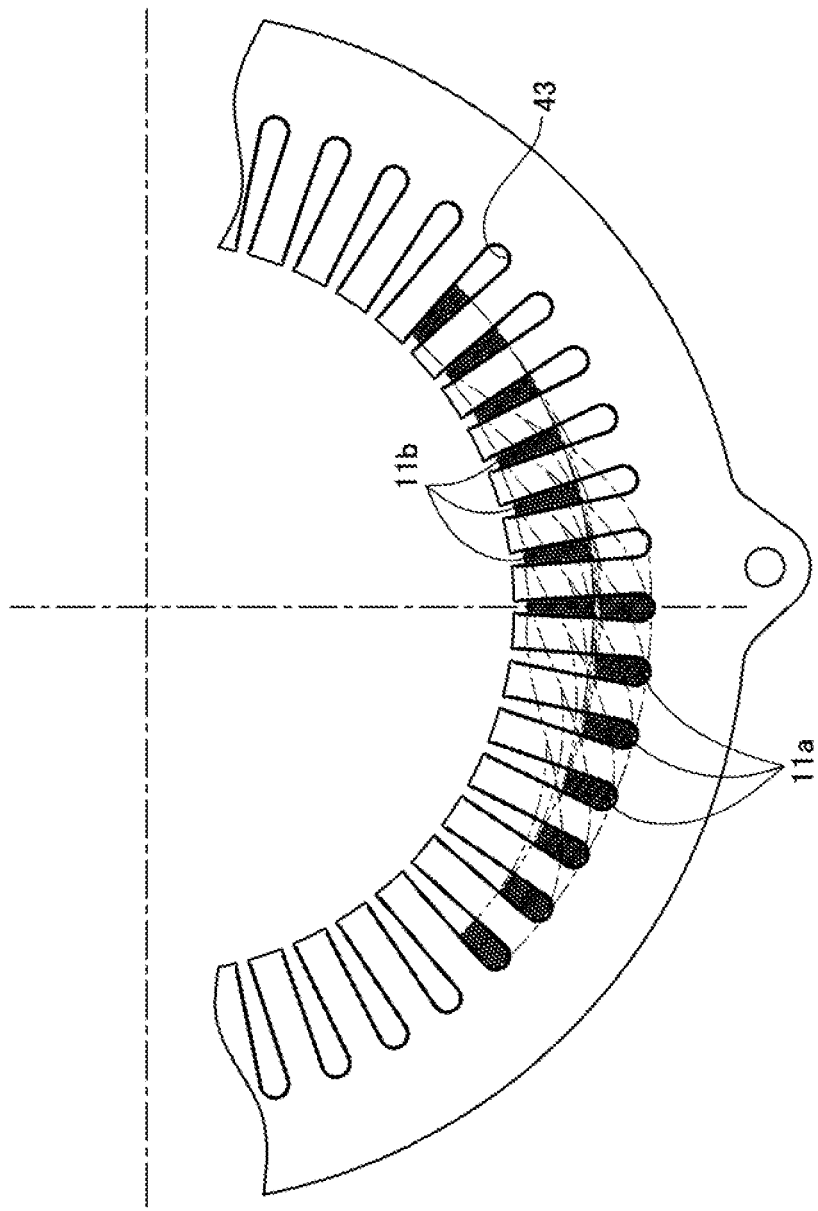
FIG. 19 is a partial plan view of the core 20 showing how seven coils 10 are similarly stored in order in the slots 22.

By repeating this process, most of the first and second storage sections 11a and 11b of the coils 10 will be stored in the slots 22, but as shown in FIG. 19, the second storage sections 11b already stored in the inner sides of the $43^{rd}$ slot 22 to the $48^{th}$ slot 72 obstruct the first storage sections 11a that are supposed to be stored at the outer sides of these slots 22. These second storage sections 11b are therefore temporarily removed from the slots 22 so that the first storage sections 11a can be inserted, and are then reinserted into the slots 22.

Although this final operation forms a boundary line 10B between the plurality of coils 10 as shown in FIG. 1(*a*), this boundary line 10B is caused by the different manners of entwinement between the coils 10, and is completely unrelated to the aforementioned issues of copper loss or protruding coil ends, and is not a cause of these issues.

The example shown in FIGS. 20 to 22 is a case where one coil is stored in one slot. In this case, unlike in the aforementioned one-slot-two coils method, there are no second storage sections 11b already stored in the inner sides of the $43^{rd}$ slot 22 to the $48^{th}$ slot 22 that obstruct the first storage sections 11a that are supposed to be stored at the outer sides of these slots 22. Therefore, as shown in FIG. 20, no boundary line 1011 will be formed between the coils 10.

The armature 100, the coils 10 constituting the armature 100, and the method for mounting these coils 10 in the slots 22 of the core 20 can be expressed in terms of the following technical means 1 to 5. First, technical means 1 is as follows: "A coil 10 for an electromechanical device, the coil 10 to be mounted in slots 22 between a plurality of teeth 21 of a core 20 for the electromechanical device that converts electrical energy and mechanical energy, wherein one or more windings 10A are wound to form the first and second storage sections 11a and 11b that axe to be stored in the slots 22, and the first and second coil ends 12a and 12b that are continuous between the first and second storage sections 11a and 11b and are arranged on the outside of the core 20, and wherein the windings 10A constituting the first storage section 11a and the second storage section 11b are held by two holding tools 30 in a state maintaining the alignment of the windings 10A, wherein when these two holding tools 30 are rotated relative to each other, in a state where the alignment of the windings 10A constituting the first storage section 11a and the second storage section 11b is maintained, the twisted section 10d can be formed in the first and second coil ends 12a and 12b, and the coil 10 can be mounted in the slots 22 between the teeth 21."

As shown in FIGS. 2 to 5 or 20, the coil 10 according to the technical means 1 consists of one or more windings 10A that are wound by distributed winding, and is held at two sections by two holding tools 30. From the completion of the coil 10 and until it has been stored in a specific slot 22, these holding tools 30 maintain the alignment of the distributedly wound windings 10A, in other words prevent them from unravelling, allowing for deformation of the first and second coil ends 12a and 12b of the coil 10 until it has been stored, without altering the shape of the first and second storage sections 11a and 11b.

The coil 10 is wound by distributed winding such as proposed in Japanese Unexamined Patent Application Publication No. 2009-195005, in which coils are wound across a plurality of slots and coils which are in phase or out of phase with each other are overlapped at the coil ends, and has first and second storage sections 11a and 11b that are stored in two respective slots 22. As shown in FIG. 4(*a*), between these first and second storage sections 11a and 11b, the first and second coil ends 12a and 12b are respectively exposed at the upper and lower sides of the drawing. Further, as shown in FIGS. 2(*a*) and 6, both ends of the windings 10A are left protruding from the coil 40 as connecting lines 10C for electrically connecting the coil 10 to another coil 10 or to a power supply.

The coil 10 according to the technical means 1 is manufactured according to the manufacturing method described later, which has a basic configuration in which one or more windings 10A are wound around a cylinder or frame to form the first and second storage sections 11a and 11b that are to be stored in the slots 22 defined b the teeth 21, and the first and second coil ends 12a and 12b that are continuous between the first and second storage sections 11a and 11b and are arranged on the outside of the core 20, and wherein the first storage section 11a and the second storage section 11b of the coil 10 are held by two holding tools 30 in a state maintaining the alignment of the windings 10A. Accordingly, these coils 10 enable the following:

(A) Both round wires and rectangular wires may be used as the conducting wires that constitute the coils, with no limitations on the shape of the cross-section of the wires.

It is important that the sections of the coil 10 that constitute the first and second storage sections 11a and 11b are held by the holding tools 30 such that the alignment of the windings 10A is maintained. This is because, as will be stated later in the description of the method for mounting the coil 10 onto the teeth 21, when a plurality of coils 10 are mounted onto the teeth 21, in a case where a curved section 10c is formed in the first and second coil ends 12a and 12b (i.e. when one coil is stored in one slot), or in a case where a twisted section 10d is formed in the first and second coil ends 12a and 12b and the twisted sections 10d of each coil 10 are overlapped with each another (i.e. when two coils are stored in one slot), the first and second coil ends 12a and 12b of the first coil will themselves naturally deform such that the first and second coil ends 42a and 12b of the next coil 10 can overlap without spaces. Accordingly, these coils enable the following:

(D) The space factor of the coils in the slots can be made high.

(When One Coil is Stored in One Slot)

In this case, the first and second storage sections 11a and 11b of the first distributedly wound coil 10 are respectively stored in a first slot 22 and in another slot 22 separate from the first slot 22 by a certain distance, as shown in FIG. 22. A portion of for example the first coil end 12a will protrude towards the center where the rotor of the stator core 20 is to be stored, as shown in FIGS. 21(*c*) and (22). At this time, however, a curved section 10c is naturally formed at the lower side of the first coil end 12a, as shown in FIG. 21(*c*).

A second coil 10 is mounted adjacent to the first coil 10, and since a curved section 10c as shown in FIG. 21 is also formed in this second coil 10, this curved section 10c will be stored in the curved section 10c of the first coil 10 without spaces. When subsequent coils 10 are mounted in this manner, the windings 10A of the coils 10 will be mounted to the stator core 20 without spaces, resulting in the completion of a stator as shown in FIGS. 20(*a*) and (*b*), which enables the following:

(D) The space factor of the coils in the slots can be made high.

(F) The coil ends can be made small for use in an electromechanical device.

(When Two Coils are Stored in One Slot)

In this case, as shown in FIG. 16(*a*), the first and second storage sections 11a and 11b of the first coil 10 are respectively stored in a first slot 22 and a second slot 22 separate from the first slot 22 by a certain distance, at which time the windings 10A constituting the first and second storage sections 11a and 11b are in an unraveled state in the slots 22, leaving space for insertion of the first and second storage sections 11a and 11b of subsequent coils 10 to be stored.

Actual insertion of the coils 10 into the stator core 20 is carried out by applying an ejecting force to the windings 10A constituting the first and second storage sections 11a and 11b of the coils 10 in a direction that is orthogonal to the wire direction of the windings 10A. Further, at each axial opening 23 of the stator core 20 there is formed a protrusion for preventing windings 10A that have been inserted from popping out. In other words, when viewing the stator core 20 from above, as exemplarily shown in FIG. 9(a), the outer sides of the slots are wider than the openings.

When inserting the first and second storage sections 11a and 11b of the coil 10 held by the holding tools 30 through the narrow openings (axial openings 23) of such a stator core 20, the windings 10A must be inserted little by little in a direction that is orthogonal to the wire directions of the windings 10A. In a case where round wire is employed as the windings 10A, they can be stored smoothly without any resistance. In addition, since the coils 10 are wound by distributed winding, upon entering the outer side, which is wider than the opening of the stator core 20, the windings 10A will naturally unravel in a direction that is orthogonal to the wire direction. As a result, the windings 10A in the stator core 20 will be inserted into the outer side at a high density, which makes the use of round wires more advantageous.

Further, in the state shown in FIG. 16(a), a twisted section 10d as shown in FIGS. 5(a) and (b) is formed in the first and second coil ends 12a and 12b of the coil 10, which twisted section 10d is formed by relative rotation of the holding tools 30 in the state shown in FIG. 2(a) by 180 degrees (to the state shown in FIG. 5(b)). At this time, the winding sections are twisted in upward order, such that, as shown in FIGS. 5 and 16(b), around the first and second coil ends 12a and 12b of the first coil 10 there is formed a space in which the twisted section 10d of a second coil 10 can be arranged in a closely adhered state. In other words, a next coil receiver 10e is formed.

When coils 10 are subsequently mounted in the same manner, the windings 10A of the coils will be mounted on the stator core 20 without spaces, resulting in the completion of a stator as shown in FIGS. 1(a) and (b), which achieves the following:

(D) The space factor of the coils in the slots can be made high.

(E) The coil ends can be made small for use in an electromechanical device.

Both in the case where one coil is stored in one slot, and in the case where two coils are stored in one slot, the distributedly wound coils 10 are stored after being put in the state shown in FIG. 5(b). In other words, looking at one coil 10, the position of the first storage section 11a stored in the first slot 22 is on the opposite side relative to the second storage section 11b stored in the second slot 22 separate from the first slot by a certain distance, due to the twisted section 10d of the coil 10.

In this state, that is when the first storage section 11a and the second storage section 11b are on opposite sides due to the twisted section 10d of the coil 10, when the first section of the windings 10A of the first storage section 11a stored in the first slot 22 is on the inner side, as shown in FIG. 16(a), the last section of the windings 10A of the second storage section 11b stored in the second slot 22 separate from the first slot by a certain distance will be located on the outer side of the second slot 22.

In general, when a ditributedly wound coil without a twisted section is stored in two slots, the first section of the windings of the first storage section stored in a first slot and the last section of the windings of the second storage section, stored in a second slot separate from the first slot by a certain distance, will be located in the same position of each slot. Since the slots, both on the rotor side and on the core side, are formed radially relative to the center of the armature, the measurements of their inner sides and the measurements of their outer sides are different. Thus, when a distributedly wound coil without a twisted section is stored within two slots, the windings will be stored in the same position, which causes inductance non-uniformity in the inner and outer windings (wires), leading to an overall drop in efficiency of the coil. The reason for this is that when an identical voltage is applied to the wires simultaneously, a greater current will flow in the wires with lower inductance, and this inductance non-uniformity will work toward reducing overall efficiency of the coil.

In the coil 10 according to this technical means, the presence of the twisted section 10d means that, as exemplarily shown in FIG. 5(b) or FIG. 16(a), when the first section of the windings 10A of the first storage section 11a stored in a first slot 22 is on the inner side, the last section of the windings 10A of the second storage section 11b stored in the second slot 22 separate from the first slot by a certain distance will be located on the outer side of the second slot 22, which reduces or suppresses the inductance non-uniformity in the parts (wires) of the coil 10, so that more magnetic flux is generated.

When the inductance non-uniformity in the parts (wires) of the coil 10 is reduced or suppressed, an overall drop in efficiency of the coils 10 is suppressed. As a result, the efficiency of an electromechanical device using these coils 10 can be improved, and the electromechanical device itself will have high output, and can be made smaller and lighter.

As described above, in the coil 10 according to the technical means 1, the presence of the twisted section 10d reduces or suppresses inductance non-uniformity in the parts (wires), which thereby enables an electromechanical device in which the coil 10 is used to have high output, and to be made smaller and lighter. As a result, the coil 10 enables the following.

(F) Inductance non-uniformity in each winding can be equalized to increase coil efficiency.

Both in a case where one coil is stored in one slot and in a case where two coils are stored in one slot, employing the coil 10 according to the technical means 1 enables the following:

(A) Both round wires and rectangular wires may be used as the conducting wires that constitute the coils, with no limitations on the shape of the cross-section of the wires.

(B) Manufacturing and handling of the coils is easy.

(C) Insertion of the coils into the slots can be done easily.

(D) The space factor of the coils in the slots can be made high.

(E) The coil ends can be made small for use in an electromechanical device.

(F) Inductance non-uniformity in each winding can be equalized to increase coil efficiency.

(G) As a result, the armature can be made compact and efficient, and it is also easy to manufacture the electromechanical device.

Accordingly, the coil 10 according to the technical means 1 has no limitations on the cross-sectional shapes of the conducting wires used to construct the coil, is easy to manufacture and handle, can easily be inserted into the slots and can have a high space factor in the slots, and has small coil ends allowing for high efficiency when used in an electromechanical device.

According to technical means 2, in the coil 10 for electromechanical devices according to the aforementioned technical means 1, "between a first radial section formed by a winding-start section 10a and a second radial section formed by a winding-end section 10b of the windings 10A constituting the coil, the radii of the winding lap sections formed by the windings 10A change in a stepped manner".

As shown in FIG. 2 or FIG. 3, the coil 10 according to the technical means 2 consists of one or more windings 10A that are distributedly wound on a tapered cylinder or a tapered frame, and two sections of the coil are held by holding tools 30. During the time from completion of the coil 10 until it has been stored in a certain slot of the core 20, these holding tools 30 prevent the distributedly wound windings 10A from unraveling, and enable deformation of the first and second coil ends 12a and 12b before they are stored, without causing deformation of the first and second storage sections 11a and 11b. This is similar to the technical means 1 described above.

In this coil 10, as shown in FIG. 4(a) or 21(c), between a first radial section formed by a winding-start section 10a and a second radial section formed by a winding end section 10b of the windings 10A constituting the coil, the radii of the winding lap sections formed by the windings 10A change in a continuous or stepped manner, as shown in FIG. 2(b) or 3. Further, in this coil 10, the sections of the windings 10A that constitute the first and second storage sections 11a and 11b are held by two holding tools 30 such that the winding lap sections are maintained aligned with each either. The term "lap winding section" here means one "hip" around the bobbin of one winding 10A.

Accordingly, this coil 10 enables the following:
(B) Manufacturing and handling of the coils is easy.
(C) Insertion of the coils into the slots can be done easily.

The coil 10 according to the technical means 2 is manufactured according to the manufacturing method described later, in which one or more windings 10A are distributedly wound around a tapered cylinder or a tapered frame, thereby forming first and second storage sections 11a and 11b to be stored in slots 22 defined by teeth 21, and first and second coil ends 12a and 12b that are continuous between the first and second storage sections 11a and 11b and arranged on the outside of a core 20, and the first and second storage sections 11a and 11b of the coil 10 are held by two holding tools 30 in a state maintaining the alignment of the windings 10A.

Accordingly, this coil 10 enables the following:
(A) Both round wires and rectangular wires may be used as the conducting wires that constitute the coils, with no limitations on the shape of the cross-section of the wires.

In this coil 10, it is important that the radii change in a stepped manner between the winding-start section 10a and the winding-end section 10b, and that to maintain this state, the first and second storage sections 11a and 11b are held by the holding tools 30 in a state maintaining the alignment of the windings 10A, as described above. This is because, as described regarding the mounting method for mounting the coils 10 onto the teeth 21, when mounting a plurality of coils 10 onto a plurality of teeth 21 and forming a curved section 10c in the first coil end 12a and the second coil end 12b, or when forming a twisted section 10d in the first coil end 12a and the second coil end 12b so that the twisted sections 10d of the coils 10 can overlap with each other, the first and second coil ends 12a and 12b of the first coil will themselves naturally deform such that the first and second coil ends 12a and 12b of the next coil 10 can overlap without spaces.

Accordingly, this coil 10 enables the following:
(D) The space factor of the coils in the slots can be made high.

Such coils 10 are then stored in slots 22 in the manner described below.

(When One Coil is Stored in One Slot)
In this case, the first and second storage sections 11a and 11b of the first distributedly wound coil 10 are respectively stored in a first slot 22 and in another slot 22 separate from the first slot 22 by a certain distance, as shown in FIG. 22. The curved section 10c of for example the first coil end 12a will protrude towards the center where the rotor of the stator core 20 is to be stored, as shown in FIGS. 21(c) and (22). At this time, however, since the radii change in a stepped manner between the winding-start section 10a and the winding-end section 10b of the coil 10, a curved section 10c in which the winding end section 10b is the widest opening is naturally formed at the lower side of the first coil end 12a, as shown in FIG. 21(c).

A second coil 10 is mounted adjacent to the first coil 10, and since a curved section 10c and a next coil receiver 10e as shown in FIG. 21 are also formed in this second coil 10, the curved section 10c and next coil receiver 10e will be stored in the curved section 10c and next coil receiver 10e of the first coil 10 without spaces. When subsequent coils 10 are mounted in this manner, the windings 10A of the coils 10 will be mounted to the stator core 20 without spaces, resulting in the completion of a stator as shown in FIGS. 20(a) and (b), which enables the following:
(D) The space factor of the coils in the slots can be made high.
(E) The coil ends can be made small for use in an electro-mechanical device.

(When Two Coils are Stored in One Slot)
In this case, as shown in FIG. 16(a), the first and second storage sections 11a and 11b of the first coil 10 are respectively stored in a first slot 22 and a second slot 22 separate from the first slot 22 by a certain distance, at which time the windings 10A constituting the first and second storage sections 11a and 11b are in an unraveled state in the slots 22, leaving space for insertion of the first and second storage sections 11a and 11b of subsequent coils 10 to be stored.

Actual insertion of the coils 10 into the stator core 20 is carried out by applying an ejecting force to the windings 10A constituting the first and second storage sections 11a and 11b of the coils 10 in a direction that is orthogonal to the wire direction of the windings 10A. Further, at each axial opening 23 of the stator core 20 there is formed a protrusion for preventing windings 10A that have been inserted from popping out. In other words, when viewing the stator core 20 from above, as exemplarily shown in FIG. 9(a), the outer sides of the slots are wider than the openings.

When inserting the first and second storage sections 11a and 11b of the coil 10 held by the holding tools 30 through the narrow openings (axial openings 23) of such a stator core 20, the windings 10A must be inserted little by little in a direction that is orthogonal to the wire directions of the windings 10A. In a case where round wire is employed as the windings 10A, they can be stored smoothly without any resistance. In addition, since the coils 10 are wound by distributed winding, upon entering the outer side, which is wider than the opening of the stator core 20, the windings 10A will naturally unravel in a direction that is orthogonal to the wire direction. As a result, the windings 10A in the stator core 20 will be inserted into the outer side at a high density, winch makes the use of round wires more advantageous.

Further, in the state shown in FIG. 16(a), a twisted section 10d as shown in FIGS. 5(a) and (b) is formed in the first and second coil ends 12a and 12b of the coil 10, which twisted section 10d is formed by relative rotation of the holding tools 30 in the state shown in FIG. 2(a) by 180 degrees (to the state shown in FIG. 5(b)). At this time, since the radii of the lap winding sections formed by the windings 10A change in a stepped manner between the first radial section formed by the minding-start section 10a and the second radial section formed by the winding-end section 10b of the windings 10A, in the twisted section 10d, the winding sections will be twisted, in upward order, from the winding section with the smallest radius to the winding section with the largest radius, and around the first coil end 12a and second coil end 12b of the first coil 10 will be formed a space in which a twisted section 10d of a second coil 10 can be arranged in a closely adhered state, as shown in FIGS. 5 and 16(b).

When coils 10 are subsequently mounted in the same manner, the windings 10A of the coils will be mounted on the stator core 20 without spaces, resulting in the completion of a stator as shown in FIGS. 1(a) and (b), which achieves the following:

(D) The space factor of the coils in the slots can be made high.

(F) The coil ends can be made small for use in an electromechanical device.

Further, in the state shown in FIG. 16(a), a twisted section 10d as shown in FIGS. 5(a) and (b) is formed in the first and second coil ends 12a and 12b of the coil 10, which twisted section 10d is formed by relative rotation of the holding tools 30 in the state shown in FIG. 2(a) by 180 degrees (to the state shown in FIG. 5(b)). At this time, since the radii of the lap winding sections formed by the windings 10A change in a stepped manner between the first radial section formed by the winding start section 10a and the second radial section formed by the winding-end section 10b of the windings 10A, in the twisted section 10d, the winding sections will be twisted, in upward order, from the winding section with the smallest radius to the winding section with the largest radius, and around the first coil end 12a and second coil end 12b of the first coil 10 will be formed a space in which a twisted section 10d of a second coil 10 can be arranged in a closely adhered state, as shown in FIGS. 5 and 16(b).

Both in a case where one coil is stored in one slot and in a case where two coils are stored in one slot, employing the coil 10 according to the technical means 2 enables the following:

(A) Both round wires and rectangular wires may be used as the conducting wires that constitute the coils, with no limitations on the shape of the cross-section of the wires.
(B) Manufacturing and handling of the coils is easy.
(C) Insertion of the coils into the slots can be done easily.
(D) The space factor of the coils in the slots can be made high.
(E) The coil ends can be made small for use in an electromechanical device.
(F) Inductance non-uniformity in each winding can be equalized to increase coil efficiency.
(G) As a result, the armature can be made compact and efficient, and it is also easy to manufacture the electromechanical device.

Accordingly, the coil 10 according to the technical means 2 has no limitations on the cross-sectional shapes of the conducting wires used to construct the coil, is easy to manufacture and handle, can easily be inserted into the slots and can have a high space factor in the slots, and has small coil ends allowing for high efficiency when used in an electromechanical device.

Technical means 3 is as follows:

"A method for manufacturing a coil 10 to be mounted in slots 22 between a plurality of teeth 21 of a core for an electromechanical device that converts electrical and mechanical energy, the method including the following steps:

(α) winding one or more windings 10A around the periphery of a bobbin 40 in the shape of a cylinder or frame having two insertion grooves 41 to form first and second storage sections 11a and 11b to be stored in the slots 22, and first and second coil ends 12a and 12b that are continuous between the first and second storage sections 11a and 11b;

(β) inserting a holding tool 30 into each insertion groove 41 to hold the windings 10A constituting the first and second storage sections 11a and 11b while maintaining the alignment of the windings 10A; and (γ) removing the coil 10 from the bobbin 40 while holding the first and second storage sections 11a and 11b of the coil 10 with the holding tools 30."

In step (a) of this manufacturing method, in an example described below, a bobbin 40 as shown in FIG. 2(b) or FIG. 3 is employed, which bobbin 40 is, for example, a tapered cylinder as shown in FIG. 2(b), where the diameter at the left end is the smallest and the diameter at the right end is the greatest. Of course, this bobbin 40 may be a simple cylinder with a uniform diameter, or a frame, in which case the frame may be tapered, with one end being smallest and the other end being greatest.

In addition, as shown in FIG. 2(b) or FIG. 3, in the bobbin 40 there are formed two insertion grooves 41 into each of which one of the two plates that constitute a holding tool 30 is inserted. A plurality of these bobbins 40 are used in actual manufacturing of the coils 10, in which case the bobbins 40 are integrated in the axial direction, having the large diameter ends paired together and the small diameter ends paired together.

In this step α, the one or more windings 10A that are the material of the coil 10 are wound around the periphery of the cylindrical or frame-shaped bobbin 40. Winding of the windings 10A in practice is carried out by feeding the windings 10A which are subjected to a predetermined tensile load onto the aforementioned integrated bobbins 40 while rotating the bobbins 40. About 4 windings 10A are fed at a time.

Further, in a case where several bobbins 40 are integrated in the axial direction, having the large diameter ends paired together and the small diameter ends paired together, a plurality of coils 10 may be formed simultaneously. In such a case, since the windings 10A are fed continuously, connections of the windings 10A at the winding-start sections 10a and winding-end sections 10b, in other words connecting wires 10C, can be formed between adjacent coils 10.

In this manner, a coil 10 having a first storage section 11a and a second storage section 11b, and a first coil end 12a and a second coil end 12b that are continuous between the first and second storage sections 11a and 11b, is formed on the bobbin 40.

Next, in step (β), after inserting part of the holding tools 30 into the insertion grooves 41 as shown in phantom in FIG. 2(b), the windings 10A constituting the first storage section 11a and the second storage section 11b are clamped by the holding tools 30. The windings 10A constituting the first storage section 11a and the second storage section 11b are thus held in parallel to each other by the holding tools 30.

Then, in step (γ), the holding tools 30 hold the first storage section 11a and the second storage section 11b of the windings 10A while the holding tools 30 and the bobbin 40 are moved relative to each other, so that the coil 10 with the windings 10A constituting the first storage section 11a and the second storage section 11b held in parallel to each other by the holding tools 30 is removed and separated from the bobbin 40.

Further, in this step (γ), in a case where several bobbins 40 are integrated in the axial direction, having the large diameter ends paired together and the small diameter ends paired together, a required number of coils 10 in which the winding-start sections 10a and winding-end sections 10b are connected can be formed by cutting the windings 10A at locations other than those between adjacent coils 10 that are to be connected at the winding-start sections 10a and winding-end sections 10b.

Accordingly, the manufacturing method according to the technical means 3 enables very easy manufacturing of a coil 10 that is easy to manufacture and handle, can easily be inserted into the slots and can have a high space factor in the slots, and has small coil ends allowing for high efficiency when used in an electromechanical device.

Technical means 4 is as follows:

"A method for mounting a coil 10 as described in technical means 1 or technical means 2 in slots 22 between a plurality of teeth 21 of a core for an electromechanical device that converts electrical and mechanical energy, the method including the following steps:

(a) forming a curved section 10c in the first and second coil ends 12a and 12b between the two holding tools 30 holding one coil 10;
(b) aligning the exits 31 of the holding tools 30 holding the coil 10 with the axial openings 23 of two respective slots 22 that are separate from each other by a specific distance;
(c) Pushing the first and second storage sections 11a and 11b held by the respective holding tools 30 into the slots 22 through the exits 31; and
(d) inserting the next coil 10, in which a curved section 10c is formed through the aforementioned steps (a) to (c), into the next slots 22 after the slots 22 in which the first coil 10 is mounted, such that the curved section 10c of the next coil 10 is inserted in the curved section 10c of the first coil 10, and repeating these steps."

This mounting method is intended to mount one coil 10 into each of a plurality of slots 22 between the teeth 21 of a core 20 for an electromechanical device to complete a stator, as shown in FIG. 22. In step (a), as shown in FIG. 21, a curved section 10c is first formed in each of the first and second coil ends 12a and 12b between two holding tools 30 holding one coil 10.

As a result, as shown in FIG. 21(a) to (c), the first radial section formed by the winding-start section 10a and the second radial section formed by the winding-end section 10b of the windings 10A change in a stepped manner with respect to the holding tools 30, and a curved section 10c open at the second radial section will be formed between each of the first and second coil ends 12a and 12b and the ends of the holding tools 30, as shown in FIG. 21(c). In this case, the curved section 10c of for example the first coil end 12a will protrude towards the center where the rotor of the stator core 20 is to be stored, as shown in FIGS. 21(c) and (22). At this time, however, since the radii change in a stepped manner between the winding-start section 10a and the winding-end section 10b of the coil 10, a curved section 10c in which the winding-end section 10b is the widest opening is naturally formed at the lower side of the first coil end 12a, as shown in FIG. 21(c).

Employing the coil 10 in which this curved section 10c is formed, in step (b), the exits 31 of the holding tools 30 holding the first coil 10 are aligned with the axial openings 23 of two respective slots 22 that are separate from each other by a specific distance. Next, in step (c), the first and second storage sections 11a and 11b held by the respective holding tools 30 are pushed into the slots 22 through the exits 31.

Then, in step (d), the next coil 10, in which a curved section 10c is formed through the aforementioned steps (a) to (c), is then inserted into the next slots 22 after the slots 22 in which the first coil 10 is mounted, such that the curved section 10c of the next coil 10 is inserted in the curved section 10c of the first coil 10.

When the second coil 10 is mounted immediately adjacent to the first coil 10, since the second coil 10 in this case also has a curved section 10c as shown in FIG. 21, this curved section 10c will be stored without spaces within the curved section 10c of the first coil 10. Subsequent coils 10 are then mounted in the same manner.

At this time, when coils 10 are mounted onto a stator core 20, as shown in FIGS. 21(c) and 22, the curved sections 100 of for example the first coil ends 12a protrude inwardly, where the rotor of the stator core 20 is to be arranged, causing the curved sections 10c to be beat toward the opposite side in a next step. In a case where the coils 10 are mounted onto a rotor, the curved sections 10c of the first and second coil ends 12a and 12b do not need to be bent, as they protrude toward the center.

As a result, the coils 10 and the windings 10A of the coils will be mounted on the stator core 20 without spaces, resulting in the completion of a stator as shown in FIG. 20, which achieves the following:

(D) The space factor of the coils in the slots can be made high.
(E) The coil ends can be made small for use in an electro-mechanical device.

Accordingly, the technical means 4 facilitates mounting of coils onto the teeth of the stator core or rotor when storing one coil in one slot, which allows for the electromechanical device to be made compact, facilitating manufacturing of the electromechanical device itself.

Finally, technical means 5 is as follows:

"A method for mounting a coil 10 as described in technical means 1 or technical means 2 in slots 22 between a plurality of teeth 21 of a core for an electromechanical device that converts electrical and mechanical energy, the method including the following steps:

(i) aligning the exit 31 of the holding tool 30 holding the first storage section 11a of the coil 10 with the axial opening 23 of one slot 22, and inserting the first storage section 11a into the slot 22;
(ii) twisting the holding tool 30 holding the second storage section 11b of the coil 10 relative to the holding tool 30 that was holding the first storage section 11a so as to form a twisted section 10d in the first and second coil ends 12a and 12b;
(iii) aligning the exit 31 of the other holding tool 30 holding the second storage section 11b of the coil 10 with the axial opening 23 of another slot 22 separate from the aforementioned slot 22, and inserting the second storage section 11b into the slot 22; and
(iv) inserting a subsequent coil 10 into a slot 22 other than that in which the previous coil 10 is mounted, while overlapping a twisted section 10d of the subsequent coil formed in steps (i) to (ii) with the twisted section 10d of the previous coil 10, and repeating these steps."

The mounting method according to the technical means 5 differs from that according to technical means 4, and as shown in FIG. 6, and is intended to insert or mount the first storage section 11a of a first coil 10 and the second storage section 11b of a second coil 10 into a plurality of slots 22 of a rotor 20, to complete a stator as shown in FIG. 1. In an initial step of this insertion or mounting of the coils 10, as shown in FIG. 16(a), the first and second storage sections 11a and 11b of the first coil 10 are distributed and stored respectively in a first slot 22, and another slot 22 separate from the first slot 22 by a certain distance. At this time, the volume of the windings 10A of each of the first and second storage sections 11a and 11b is half the volume of each slot 22, so the windings 10A are in an unraveled state within the slots 22. There is enough free space left in each slot with the first storage second 11a or the second storage section 11b stored therein to accommodate the first storage section 11a or the second storage section 11b of another coil 10 to be subsequently stored.

In step (i), the exit 31 of the holding tool 30 holding the first storage section 11a of the coil 10 is aligned with the axial opening 23 of one slot 22, and the storage section 11a is then inserted into the slot 22. In a case where the second storage section 11b of another coil 10 has not yet been inserted into the slot 22 into which this first storage section 11a is to be inserted, the windings 10A constituting the first storage section 11a will be stored in the slot 22 in an unraveled state, and by forcefully packing the second storage section 11b of another coil 10 into the slot 22, the first storage section 11a of the first coil 10 and the second storage section 11b of the subsequent coil 10 will be stored in a closely adhered state. This insertion is carried out by the holding tool 30 and the ejecting plate that ejects the windings 10A from the holding tool 30 in step (iii).

In step (ii), the holding tool 30 holding the second storage section 11b of the coil 10 is twisted relative to the holding tool 30 that was holding the first storage section 11a so as to form a twisted section 10d as exemplarily shown in FIG. 5 in the first and second coil ends 12a and 12b. This twisted section 10d is formed by relative rotation of the holding tools 30 in the state shown in FIG. 2(a) by 180 degrees (to the state shown in FIG. 5(b)).

When this twisted section 10d is formed, between a first radial section formed by a winding-start section 10a and a second radial section formed by a winding-end section 10b of the windings 10A, the radii of the winding lap sections formed by the windings 10A change in a stepped manner. Therefore, in the twisted section 10d, the winding sections will be twisted, in upward order, from the winding section with the smallest radius to the winding section with the largest radius, and around the first coil end 12a and second coil end 12b of the first coil 10 will be formed a space in which a twisted section 10d of a second coil 10 can be arranged in a closely adhered state, as shown in FIGS. 5 and 16(b).

Next, in step (iii), the exit 31 of the other holding tool 30 holding the second storage section 11b the coil 10 is aligned with the axial opening 23 of another slot 22 separate from the aforementioned slot 22, and the second storage section 11b is ejected from the holding tool 30 by the ejecting plate and inserted into the slot 22.

In step (iv), a subsequent coil 10 is inserted into a slot 22 other than that in which the previous coil 10 is mounted, while overlapping a twisted section 10d of the subsequent coil formed in steps (i) to (ii) with the twisted section lad of the previous coil 10. This process is then repeated.

At this time, the center of the twisted section 10d of the previous coil 10 is more constricted due to the twisting than the peripheral sections, such that the peripheral sections of the twisted section 10d are in an expanded state, so that a space is formed in the vicinity of the twisted section 10d in which the twisted section 10d of a subsequent coil 10 to be inserted into a subsequent slot 22 separate from the first slot 22 by a certain pitch can be stored in a closely adhered state. In other words, the twisted section 10d of the subsequent coil 10 is arranged so as to be entwined with the twisted section 10d of the previous coil 10, and once insertion of the previous coil 10 and the adjacent subsequent coil 10 is finished, these twisted sections 10d will be in a closely adhered state.

In the stator core 20 constituting the electromechanical device, which is a motor or a generator or the like, the plurality of slots 22 having axial openings 23 are formed in a circular shape with the axial openings 23 in communication with the circular opening in which the rotor is to be stored. Conversely, on the outer surface of a rotor that is stored in the circular opening of a stator core 20, a plurality of slots 22 are formed in a circular shape with the axial openings 23 facing outward.

When two distributedly wound coils 10 are to be inserted into such a plurality of slots 22 in a state where two coils are stored in one slot, there will naturally be cases where coils 10 previously inserted in the final step become obstructions. By final step is meant a step in which, when the first storage sections 11a of the first to seventh coils 10 are inserted in order into the first to seventh slots 22, respectively, the second storage sections 11b of the final $n^{th}$ to n-$6^{th}$ coils 10 are inserted into the final $n^{th}$ to n-$6^{th}$ slots 22.

Thus, in the final step of the insertion process, with respect to a slot 22 into which the second storage section 11b is to be inserted but a first storage section 11a of the previous coil 10 has already been inserted, the first storage section 11a is temporarily taken out, and the second storage section 11b of the next coil 10 is inserted and pushed into the outer side of the slot 22, while the first storage section 11a is reinserted so as to be at the inner side.

In this way, when coils 10 are subsequently mounted, the windings 10A of the coils will be mounted on the stator core 20 without spaces, resulting in the completion of a stator as shown in FIGS. 1(a) and (b), which achieves the following:

(D) The space factor of the coils in the slots can be made high.

(E) The coil ends can be made small for use in an electromechanical device.

Therefore, according to the technical means 5, in a case where two coils are stored in one slot, mounting of the coils onto the teeth of the stator core or rotor can be easily performed and the electromechanical device can be made compact, facilitating manufacturing of the electromechanical device itself.

DESCRIPTION OF THE REFERENCE NUMERAL

100 Armature
10 Coil
10A Winding
10B Boundary line
10C Connecting wire
10a Winding-start section
10b Winding-end section
10c Curved section
10d Twisted section
10e Next coil. receiver
11a First storage section
11b Second storage section 12a First coil end
12b Second coil end
20 Core
21 Teeth
22 Slot
22a Inner side storage section
22b Outer side storage section
23 Axial opening
30 Holding tool
31 Exit
32 Base plate
33 Swinging plate
34 First engaging pin
35 Second engaging pin
40 Bobbin
41 Insertion groove
50 Coil mounting device
51 Coil shelf
52 Core rotator
53a First assist arm
53b Second assist arm
54a First guide channel
54b Second guide channel
55a First stopper
55b Second stopper

The invention claimed is:

1. An armature 100 that constitutes an electromechanical device that converts electrical and mechanical energy, the armature comprising:
   a plurality of distributedly wound coils 10, each coil 10 having a first storage section 11a, a second storage section 11b, and a first coil end 12a and a second coil end 12b that electrically connect the first storage section 11a and the second storage section 11b; and
   a stator core or rotor 20 having a plurality of slots 22 in which the coils 10 are stored,
   wherein in each coil 10, between a first radial section formed by a winding-start section 10a and a second radial section formed by a winding-end section 10b of windings 10A constituting the coil 10, circumferential lengths of winding lap sections formed by the windings 10A change in a continuous or stepped manner,
   a first coil 10, the first storage section 11a and second storage section 11b of which are stored in two slots 22, has a twisted section 10d formed in each of its first coil end 12a and second coil end 12b, whereby sequences within the two slots 22 of the windings 10A constituting the first coil 10 are reversed with respect to each other,
   a second coil 10, stored in next two slots 22 after the slots 22 in which the first coil 10 is stored, has twisted sections 10d that are shifted relative to the twisted sections 10d of the first coil 10 by an amount of pitch between the respective slots 22, whereby the twisted sections 10d of the first coil 10 and the second coil 10 become three-dimensionally entwined in a lap winding, and
   the lap windings of the twisted sections 10d continue for a third coil 10 and subsequent coils 10, such that the first coil ends 12a and the second coil ends 12b of the coils 10 are continuous without spaces at an end face of the stator core or rotor 20.

2. A method for manufacturing an armature 100 that constitutes an electromechanical device that converts electrical and mechanical energy, the armature comprising:
   a plurality of distributedly wound coils 10, each coil 10 having a first storage section 11a, a second storage section 11b, and a first coil end 12a and a second coil end 12b that electrically connect the first storage section 11a and the second storage section 11b; and
   a stator core or rotor 20 having a plurality of slots 22 in which the coils 10 are stored, the method comprising the following steps:
   (1) winding windings 10A that constitute each coil 10 such that between a first radial section formed by a winding-start section 10a and a second radial section formed by a winding-end section 10b of the windings 10A, circumferential lengths of winding lap sections formed by the windings 10A change in a continuous or stepped manner;
   (2) relatively rotating two robotic hands or holding tools 30 that hold one coil 10 to form a twisted section 10d in each of the first coil end 12a and the second coil end 12b;
   (3) aligning exits 31 of the two robotic hands or holding tools 30 that hold the coil 10 with axial openings 23 of two respective slots 22 that are separate from each other by a certain distance;
   (4) pushing the first storage section 11a and the second storage section 11b held by the two robotic hands or holding tools 30 through the exits 31 into the respective slots 22; and
   (5) inserting a subsequent coil 10 into next slots 22 after the slots 22 in which the previous coil 10 is mounted, while lap winding the twisted sections 10d formed in step (2) with the twisted sections 10d of the previous coil 10, and repeating these steps.

* * * * *